United States Patent
Mehta et al.

(10) Patent No.: US 11,895,192 B1
(45) Date of Patent: Feb. 6, 2024

(54) MANAGING SUBSCRIPTIONS TO RESOURCE UPDATES MADE VIA A TARGET INTERFACE

(71) Applicant: SPLUNK INC., San Francisco, CA (US)

(72) Inventors: Neel Mehta, Toronto (CA); Allyson Aberg, Toronto (CA); Joel Jacob, Etobicoke (CA); William Huang, Vaughan (CA); Neha Kumari, Richmond Hill (CA); Yi Chien Lee, Oakville (CA); Anthony Ng, Toronto (CA); Rodrigo Paulo Quaresma, Burlington (CA); Qi Shu, Newmarket (CA); Warren Shum, Mississauga (CA); Jonathan Yeung, Mississauga (CA)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 18/050,024

(22) Filed: Oct. 26, 2022

(51) Int. Cl.
*G06F 15/16* (2006.01)
*H04L 67/12* (2022.01)
*H04L 67/55* (2022.01)

(52) U.S. Cl.
CPC .............. *H04L 67/12* (2013.01); *H04L 67/55* (2022.05)

(58) Field of Classification Search
CPC ................................. H04L 67/12; H04L 67/55
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2005/0234993 A1* | 10/2005 | Ordille | H04L 12/18 |
| 2018/0255061 A1* | 9/2018 | Sikri | H04L 63/205 |

(Continued)

OTHER PUBLICATIONS

Splunk Enterprise 8.0.0 Overview, available online, retrieved May 20, 2020 from docs.splunk.com.

(Continued)

*Primary Examiner* — Normin Abedin
(74) *Attorney, Agent, or Firm* — Artegis Law Group, LLP

(57) ABSTRACT

A wrapper layer over a target interface receives requests from client devices over a different interface, converts the requests into a format that is compatible with the target interface, and transmits each converted request over the target interface for processing by a service. The wrapper layer also processes a request by a client device to subscribe to a certain type of update made via the target interface by verifying that the client device is authorized to access a resource associated with that type of update and creating a subscription that identifies the client device and the type of update. When the wrapper layer subsequently receives a request corresponding to that type of update, the wrapper layer matches attributes of the request to the subscription by the client device and transmits a message notifying the client device of the request.

20 Claims, 8 Drawing Sheets

(56) References Cited

U.S. PATENT DOCUMENTS

2019/0098106 A1    3/2019  Mungel et al.
2022/0166635 A1*   5/2022  Mohan ................. H04L 9/3213

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

MANAGING SUBSCRIPTIONS TO RESOURCE UPDATES MADE VIA A TARGET INTERFACE

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to collecting, managing, understanding, and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing. Collecting and storing massive quantities of minimally processed or unprocessed data for later retrieval and analysis is becoming increasingly more feasible as new techniques are developed.

BRIEF DESCRIPTION OF THE DRAWINGS

Illustrative examples are described in detail below with reference to the following figures.

DETAILED DESCRIPTION

Figure 1:
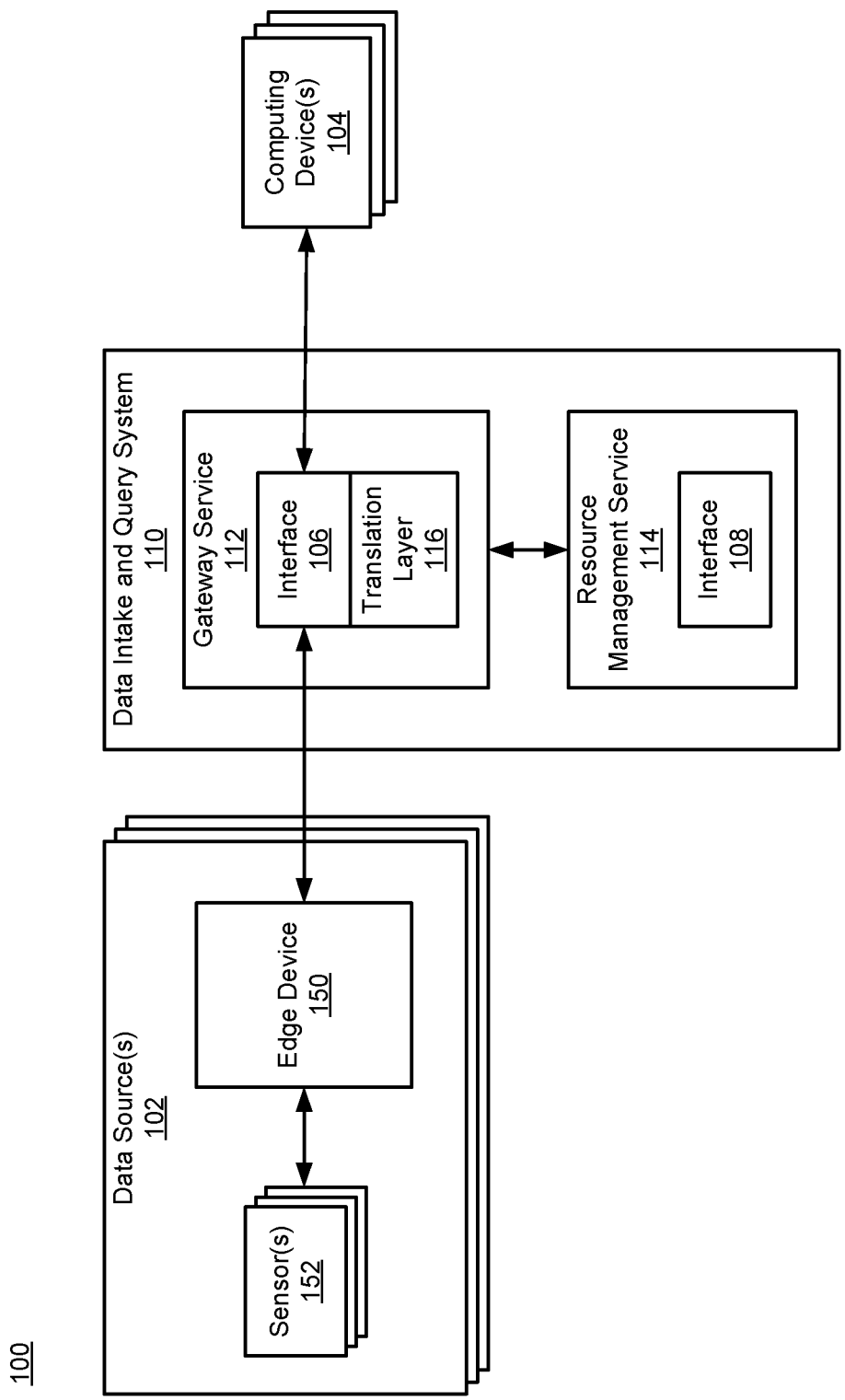
FIG. 1 illustrates a block diagram of an example data processing environment.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of techniques are used to collect and analyze machine data. For example, edge devices coupled with sensors can be deployed within the IT environment to collect machine data and send the machine data to a data intake and query system. In such configurations, the edge devices and sensors function as data sources for the data intake and query system. The system may then parse the machine data to produce events (each having a portion of machine data associated with a timestamp), and then store the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

During operation, the edge devices communicate with the data intake and query system over one or more interfaces. For example, each edge device could send and receive data over a representational state transfer (REST) application programming interface (API) provided by the data intake and query system. As a given edge device interacts with the data intake and query system over an interface, the state of the edge device and/or the data intake and query system can change. Continuing with the above example, an edge device could interact with a service endpoint providing the REST API to register with the data intake and query system, unregister with the data intake and query system, toggle between an "enabled" state and a "disabled" state, start or stop one or more sensors coupled to the edge device, change a setting or configuration on the edge device, transmit sensor data from the sensor(s) to the data intake and query system, and/or perform other actions related to the operation of the edge device and/or the data intake and query system.

As the state of an edge device and/or the state of the data intake and query system change, other devices can be notified of these changes. For example, a computing device that is used to manage the operation of an edge device could be configured to receive messages that notify the computing device of changes to the state of the edge device and/or the data intake and query system. In response to these messages, the computing device could update a user interface, application, and/or another component that is used to manage the operation of the edge device and/or the interaction of the edge device with the data intake and query system with the corresponding changes. For example, a user could interact with the component(s) to verify that the edge device has successfully registered with the data intake and query system, determine the latest state of the edge device and/or data intake and query system, track changes to the edge device and/or data intake and query system over time, specify additional changes to the state of the edge device, view sensor data transmitted from the edge device to the data intake and query system, and/or perform other tasks related to the edge device and/or data intake and query system.

However, REST APIs and similar types of interfaces typically operate via a request-response paradigm in which clients transmit requests to these interfaces and receive responses to the requests from services providing the interfaces. Under this paradigm, a given service does not "push" messages to the clients over a corresponding interface. Instead, the clients regularly or continuously poll the interface provided by the service for updates related to the service. This repeated polling can cause the service to process large numbers of redundant requests for updates, thereby incurring significant resource overhead. Additionally, a client is not notified of a certain update under this paradigm until a polling request is received from the client after the update is made. Consequently, the client can experience a delay of up to the polling period associated with polling requests made by the client in receiving a notification of the update from the service.

Continuing with the above example, a computing device that wishes to be notified of updates to an edge device could periodically (e.g., every five minutes) send a polling request for updates related to the edge device to a REST API provided by a service endpoint. If the edge device is updated once a day on average, the service endpoint would process an average of 288 polling requests from the computing device before transmitting a single response notifying the computing device of a change to the edge device. Further, the five-minute gap between consecutive polling requests from the computing device could cause up to a five-minute delay between the time at which a change is made to the edge device by the resource management service 114 and the time at which the computing device is notified of the change.

To address shortcomings such as those set forth above, the disclosed techniques use a wrapper layer over a REST API and/or another type of target interface to track updates made over the target interface and generate notifications of the updates. The wrapper layer receives requests from client devices over a different interface and converts the requests into a format that is compatible with the target interface. The wrapper layer transmits each of the converted requests over the target interface for processing by a service or service endpoint providing the target interface. After the wrapper layer receives a response to a converted request over the target interface, the wrapper layer converts the response into a format that is compatible with the interface provided by the wrapper layer. The wrapper layer then transmits the converted response over the interface to the client from which the original request was received.

The wrapper layer additionally processes and manages additional requests from clients that would like to subscribe to updates associated with the target interface. After receiving a request from a client device to subscribe to a certain type of update, the wrapper layer first verifies that the client device is authorized to access a resource associated with the type of update. Next, the wrapper creates a subscription that includes metadata related to the client device and the type of update. This subscription indicates that the client device is to be notified of requests pertaining to that type of update.

When the wrapper layer receives a request corresponding to an update associated with the target interface, the wrapper layer matches one or more attributes of the request to metadata associated with a set of subscriptions by a set of client devices. For example, the wrapper layer could match the type of request, an identifier for an edge device targeted by the request, and/or other attributes or parameters of the request to subscriptions that include these attributes. The wrapper layer also uses identifiers in the subscriptions to determine a set of client devices associated with these subscriptions. The wrapper layer then transmits messages to the client devices to notify the clients of the request.

One of various technical advantages of the disclosed techniques relative to the prior art is that the wrapper layer is able to detect changes made via the target interface and notify subscribers of the changes in a real-time or near-real-time manner. Accordingly, the disclosed techniques allow the subscribers to be notified of the changes more quickly than prior art approaches that incur delays between changes made via an interface and the notification of clients of the changes. Another technical advantage of the disclosed techniques is that the wrapper layer can transmit notifications for a certain type of update to a client device after receiving a single request from the client device. In this regard, the disclosed techniques incur less resource overhead in processing client requests for notifications of updates made over an interface than prior art approaches that involve repeated polling of interfaces to detect changes made via the interfaces. These technical advantages provide one or more technological improvements over prior art approaches.

FIG. 1 illustrates a block diagram of an example data processing environment 100. In the illustrated example, the data processing environment 100 includes one or more data sources 102, a data intake and query system 110, and one or more computing devices 104 (alternatively referred to as "client devices" or "client computing devices"). Each of the data sources 102 may include an edge device 150 that is communicatively coupled with one or more sensors 152. In some examples, the data processing environment 100 may be alternatively referred to as a "computing environment".

The data intake and query system 110, edge devices 150, and computing devices 104 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a computing device 104 can communicate with an edge device 150 via one or more of these networks. For example, if the edge device 150 is configured as a web server and the computing device 104 is a laptop, the laptop can communicate with the web server to view a website.

The computing devices 104 can correspond to distinct computing devices that can configure, manage, or send queries to the data intake and query system 110. Examples of the computing devices 104 may include, without limitation, smart phones, tablet computers, handheld computers, wearable devices, laptop computers, desktop computers, servers, portable media players, gaming devices, or other device that includes computer hardware (e.g., processors, non-transitory computer-readable media, etc.) and so forth. In certain cases, the computing devices 104 can include a hosted, virtualized, or containerized device, such as an isolated execution environment, that shares computing resources (e.g., processor, memory, etc.) of a particular machine with other isolated execution environments.

The computing devices 104 can interact with the data intake and query system 110 and/or the edge devices 150 in a variety of ways. For example, the computing devices 104 can communicate with the data intake and query system 110 and/or the edge devices 150 over an Internet (Web) protocol, via a gateway, via a command line interface, via a software developer kit (SDK), a standalone application, etc. In another example, the computing devices 104 can use one or more executable applications or programs to interface with the data intake and query system 110. As described in further detail below, the computing devices 104, the data intake and query system 110, and/or the edge devices 150 can further communicate with one another via an interface 106 provided by a gateway service 222 and/or an interface 108 provided by a resource management service 224.

The edge devices 150 can include distinct computing devices or systems that include or have access to data that can be ingested, indexed, and/or searched by the data intake and query system 110. The edge devices 150 can include, but are not limited to, servers, routers, personal computers, mobile devices, internet of things (IOT) devices, or hosting devices, such as computing devices in a shared computing resource environment on which multiple isolated execution environments (e.g., virtual machines, containers, etc.) can be instantiated, or other computing devices in an IT environment (e.g., device that includes computer hardware, e.g., processors, non-transitory computer-readable media, etc.). In some examples, the edge devices 150 may receive the data from the sensors 152 for subsequent processing by the data intake and query system 110. Thus, each one of the edge devices 150 and its associated one or more sensors 152 may constitute one of the data sources 102.

The sensors 152 may include one or more of a variety of sensor types, such as (but not limited to), a light sensor, an image capture sensor (e.g., a camera), a sound sensor (e.g., a microphone), a vibration sensor, an accelerometer, a gyroscope, a pressure sensor, a humidity sensor, a gas sensor, and/or a location sensor (e.g., a Global Navigation Satellite System (GNSS) receiver). While the sensors 152 are shown as being external to the edge devices 150, the sensors 152 may include a combination of internal and external sensors. For example, the sensors 152 may include an internal vibration sensor and/or an external vibration sensor that provide vibration measurements within a corresponding edge device 150 and of the external environment, respectively. External sensors 152 may provide measurement data corresponding to one or more target devices located within the data processing environment, such as a server computer to which one or more of the sensors 152 are attached.

The types of data that are generated by each of the data sources 102 (and consequently by each of the edge devices 150) can include machine data such as, for example and without limitation, server log files, activity log files, configuration files, messages, network packet data, performance measurements, sensor measurements, etc. In some cases, one or more applications executing on the edge devices 150 may generate various types of machine data during operation. For example, a web server application executing on one of the edge devices 150 may generate one or more web server logs detailing interactions between the web server and any number of the computing devices 104 or other devices.

As another example, one of the edge devices 150 could include a router that generates one or more router logs that record information related to network traffic managed by the router. As yet another example, a database server application executing on one of the edge devices 150 could generate one or more logs that record information related to requests sent from other devices (e.g., web servers, application servers, client devices, etc.) for data managed by the database server. Similarly, one of the edge devices 150 could generate and/or store computing resource utilization metrics, such as, but not limited to, CPU utilization, memory utilization, number of processes being executed, etc. Any one or any combination of the files or data generated in such cases can be used as a data source for the data intake and query system 110.

As used herein, obtaining data from one of the data sources 102 may refer to communicating with one of the edge devices 150 to obtain data from the edge device 150 (e.g., from the sensors 152 associated with the edge device 150 or some other data stream or directory on the edge device 150, etc.). For example, obtaining data from one of the data sources 102 may refer to requesting data from one of the edge devices 150 and/or receiving data from the edge device 150. In some such cases, the edge device 150 can retrieve and return the requested data and/or the data intake and query system 110 can retrieve the data from the edge device 150 (e.g., from a particular file stored on the edge device 150).

The data intake and query system 110 can ingest, index, and/or store data from heterogeneous data sources and/or edge devices 150. For example, the data intake and query system 110 can ingest, index, and/or store any type of machine data, regardless of the form of the machine data or whether the machine data matches or is similar to other machine data ingested, indexed, and/or stored by the data intake and query system 110. In some cases, the data intake and query system 110 can generate events from the received data, group the events, and store the events in buckets. The data intake and query system 110 can also search heterogeneous data that it has stored or search data stored by other systems. For example, in response to received queries, the data intake and query system 110 can assign one or more components to search events stored in the storage system or search data stored elsewhere.

As will be described herein in greater detail below, the data intake and query system 110 can use one or more components to ingest, index, store, and/or search data. In some implementations or examples, the data intake and query system 110 is implemented as a distributed system that uses multiple components to perform its various functions. For example, the data intake and query system 110 can include any one or any combination of an intake system to ingest data, an indexing system to index the data, a storage system to store the data, and/or a query system (or search system) to search the data, etc. In some cases, the components of the data intake and query system 110 are implemented as distinct computing devices having their own computer hardware (e.g., processors, non-transitory computer-readable media, etc.) and/or as distinct hosted devices (e.g., isolated execution environments) that share computing resources or hardware in a shared computing resource environment.

The data intake and query system 110 can receive data from the edge devices 150, perform one or more preliminary processing operations on the data, and communicate the data to the indexing system, query system, storage system, or to other systems (which may include, for example, data processing systems, telemetry systems, real-time analytics systems, data stores, databases, etc., any of which may be operated by an operator of the data intake and query system 110 or a third party). Given the amount of data that can be ingested by the intake system, in some implementations or examples, the intake system can include multiple distributed computing devices or components working concurrently to ingest the data. The preliminary processing operations performed by the intake system can include, but are not limited to, associating metadata with the data received from the edge devices 150, extracting a timestamp from the data, identifying individual events within the data, extracting a subset of machine data for transmittal to the indexing system, enriching the data, etc.

In some environments, a user of the data intake and query system 110 may install and configure, on computing devices owned and operated by the user, one or more software applications that implement some or all of the components of the data intake and query system 110. For example, with reference to FIG. 1, a user may install a software application on server computers owned by the user and configure each server to operate as one or more components of the intake system, indexing system, query system, shared storage system, or other components of the data intake and query system 110. This arrangement generally may be referred to as an "on-premises" solution. That is, the data intake and query system 110 is installed and operates on computing devices directly controlled by the user of the data intake and query system 110. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 110 operate.

In certain examples, one or more of the components of the data intake and query system 110 can be implemented in a shared computing resource environment. In this context, a shared computing resource environment or cloud-based service can refer to a service hosted by one more computing resources that are accessible to end users over a network (e.g., by using a web browser or other application on a client device to interface with the remote computing resources). For example, a service provider may provide a system 110 by managing computing resources configured to implement various aspects of the system and by providing access to the system to end users via a network. Typically, a user may pay a subscription or other fee to use such a service. Each subscribing user of the cloud-based service may be provided with an account that enables the user to configure a customized cloud-based system based on the user's preferences.

Implementing the data intake and query system 110 in a shared computing resource environment can provide a number of benefits. In some cases, implementing the data intake and query system 110 in a shared computing resource environment can make it easier to install, maintain, and update the components of the data intake and query system 110. For example, rather than accessing designated hardware at a particular location to install or provide a component of the data intake and query system 110, a component can be remotely instantiated or updated as desired. Similarly, implementing the data intake and query system 110 in a shared computing resource environment or as a cloud-based service can make it easier to meet dynamic demand. For example, if the data intake and query system 110 experiences significant load at indexing or search, additional computer resources can be deployed to process the additional data or queries. In an "on-premises" environment, this type of flexibility and scalability may not be possible or feasible.

As mentioned above, the data sources 102, the computing devices 104, and the data intake and query system 110 can use the interface 106 provided by the gateway service 112 and/or the interface 108 provided by the resource management service 114 to communicate with one another. For example, the data sources 102, the computing devices 104, and the data intake and query system 110 can use one or both interfaces 106 and/or 108 to perform tasks such as registering or unregistering a given data source 102 with the data intake and query system 110; toggling an edge device 150 between an "enabled" state and a "disabled" state; initiating or stopping anomaly detection on the edge device 150; transmitting heartbeat requests (e.g., to inform the resource management service 324 that the edge device 150 is healthy) related to the edge device 150; starting, stopping, connecting, or disconnecting one or more sensors 152 coupled to the edge device 150; changing a setting or configuration on the edge device 150 and/or one or more sensors 152 (e.g., the rate at which sensor data is transmitted from the edge device 150 to the data intake and query system 110, the language used by the edge device 150, a screensaver timeout on the edge device 150, the name of the edge device 150, etc.); updating or rebooting software on the edge device 150; and/or performing other actions pertaining to states associated with the edge device 150, the sensors 152, the computing devices 104, and/or the data intake and query system 110.

More specifically, the resource management service 114 enables the data sources 102 and/or the computing devices 104 to access various resources associated with the data intake and query system 110. Continuing with the above example, the resource management service 114 could implement service endpoints, functions, methods, and/or other components that perform the tasks with respect to resources corresponding to the edge devices 150, sensors 152, computing devices 104, and/or various portions of the data intake and query system 110.

The resource management service 114 is accessed via a corresponding interface 108. For example, the resource management service 114 could include one or more service endpoints that implement a representational state transfer (REST) application programming interface (API). The data sources 102, the computing devices 104, and/or the data intake and query system 110 can transmit requests to the REST API to access functionality and/or resources provided by the service endpoints. The data sources 102, the computing devices 104, and/or the data intake and query system 110 can also receive responses to the requests from the service endpoints over the REST API.

However, as mentioned above, the request-response paradigm used in REST APIs and/or similar types of interfaces does not support the "pushing" of messages from a given service (e.g., the resource management service 114) to the data sources 102, the computing devices 104, the data intake and query system 110, and/or other client devices that interact with the service. Instead, the client devices are typically configured to regularly or continuously poll the interface provided by the service for updates related to the service. This repeated polling can cause the service to process large numbers of redundant requests for these updates, thereby incurring significant resource overhead. Additionally, a client is not notified of a certain update under this paradigm until the client submits a polling request after the update is made. Consequently, the client can experience a delay of up to the polling period associated with polling requests made by the client in receiving a notification of the update from the service.

Continuing with the above example, a certain computing device 104 that needs to be notified of updates to a certain edge device 150 could periodically (e.g., every five minutes) send a polling request to a REST API provided by a service endpoint in the resource management service 114 for updates related to the edge device 150. If the edge device 150 is updated once a day on average, the service endpoint would process an average of 288 polling requests from the computing device 104 before transmitting a single response notifying the computing device 104 of a change to the edge device 150. Further, the five-minute gap between consecutive polling requests from the computing device 104 could cause up to a five-minute delay between the time at which a change is made to the edge device 150 by the resource management service 114 and the time at which the computing device 104 is notified of the change.

To reduce the request volume, request processing, and latency associated with notifying the data sources 102, the computing devices 104, the data intake and query system 110, and/or other client devices of updates related to the resource management service 114, the gateway service 112 implements a wrapper layer over the interface 108 provided by the resource management service 114. The wrapper layer receives requests for accessing resources associated with the resource management service 114 from the client devices over a different interface 106. The gateway service 112 also includes a translation layer 116 that converts the requests into a format that is compatible with the interface 108 provided by the resource management service 114. The gateway service 112 transmits each of the converted requests over the interface 108 for processing by the resource management service 114 and/or a service endpoint associated with the resource management service 114. After the gateway service 112 receives a response to a converted request over the same interface 108, the translation layer 116 converts the response into a format that is compatible with the interface 106 provided by the gateway service 112. The wrapper layer then transmits the converted response over the same interface 106 to the client device from which the original request was received. Consequently, the gateway service 112 can be used to intercept, track, and manage requests associated with resources that are accessed via the resource management service 114 and the interface 108 provided by the resource management service 114.

Because the gateway service 112 receives and manages requests that are subsequently converted and directed to the resource management service 114 and the corresponding interface 108, the gateway service 112 can also be used to generate messages or notifications of changes or updates made by the resource management service 114 in response to these requests. For example, the gateway service 112 can track requests received over the interface 106 that are used to update the state associated with a certain edge device 150. After one of these requests is received over the interface 106, the gateway service 112 transmits messages to one or more computing devices 104 that have subscribed to updates to that edge device 150 to notify the computing device(s) 104 of the update made by the received request. These messages can be transmitted to the computing device(s) 104 once the request is received over the interface 106, after the request is converted into a corresponding request that is compatible with the interface 108 provided by the resource management service 114, after the converted request is transmitted to the interface 108, after a response to the converted request is received over the interface 108, after the response is converted into a corresponding response that is compatible with the interface 106 provided by the gateway service 112, and/or after the converted response is transmitted over the interface 106 to the source of the original request. Thus, the gateway service 112 allows client devices to be notified of changes made by the resource management service 114 to various resources without requiring the client devices to continuously and/or periodically poll the resource management service 114 for the changes.

More specifically, the gateway service 112 notifies client devices of updates associated with the interface 108 and/or the resource management service 114 based on subscriptions of the client devices to the updates. A client device can request a subscription to a certain type of update by transmitting a corresponding subscription request to the gateway service 112. After receiving the subscription request, the gateway service 112 initially verifies that the client device is authorized to access one or more resources associated with the subscription request. The gateway service 112 then creates a subscription that includes metadata related to the client device and/or the type of update to which the client device would like to subscribe. The gateway service 112 also establishes a web socket connection with the client device and uses the web socket connection to transmit messages related to the subscription to the client device. Operations involved in establishing a subscription by a client device to a type of update performed by the resource management service 114 are described in further detail below with respect to FIG. 2.

After the gateway service 112 has established a subscription by a client device to a certain type of update performed by the resource management service 114, the gateway service 112 uses the metadata in the subscription to notify the client device of requests related to that type of update. In particular, after receiving a request that includes that type of update over the interface 106 provided by the wrapper layer, the gateway service 112 matches one or more attributes of the request to metadata associated with a set of subscriptions by a set of client devices. The gateway service 112 then transmits messages over the interface 106 implemented by the wrapper layer and/or the web socket connections with the set of client devices to notify the client devices of the request. Operations involved in notifying a client device of a type of update performed by the resource management service 114 are described in further detail below with respect to FIG. 3.

Figure 2:
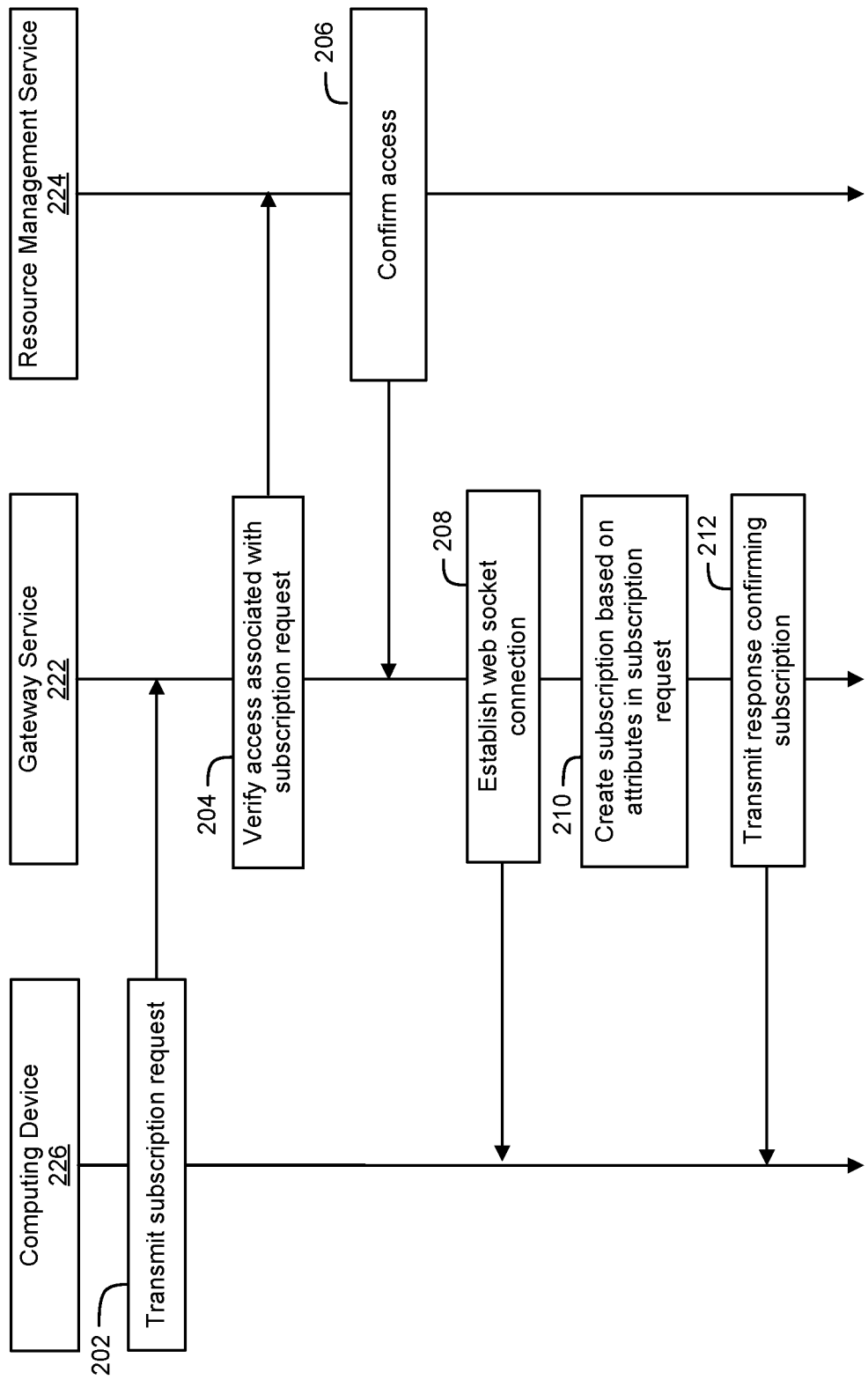
FIG. 2 illustrates an example sequence of operations involved in creating a subscription of a computing device to changes made via a resource management service.

FIG. 2 illustrates an example sequence of operations 202-212 involved in creating a subscription of a computing device 226 to changes made via the resource management service 224. As shown in FIG. 2, the computing device 226 begins with an operation 202 that includes transmitting a subscription request to a gateway service 222.

In some examples or implementations, the computing device 226 transmits the subscription request to an interface provided by the gateway service 222. The subscription request includes fields and/or other data that identify the computing device 226 and/or the type of change to which the computing device 226 would like to subscribe. For example, the subscription request could include the following representation:

subscription {
  isAlive(edge_device_id: "0280e30f-0135-4c24-8f34-a6a67a4f41cb")
  {
    edge_device_id
  }
}

In the above representation, the request includes a type of "subscription." The request also includes an "edge_device_id" field that specifies an identifier for a certain edge device for which the computing device 226 would like to receive updates. The request additionally specifies that the subscription is for an "isAlive" type of update for the edge device. The subscription request can also include a header and/or additional metadata (not shown in the above representation) that specifies an identifier for the computing device 226, an identifier for the subscription request, a timestamp, and/or other information that can be used to establish and/or track the subscription.

In response to the subscription request from the computing device 226, the gateway service 222 performs an operation 204 that verifies access associated with the subscription request. More specifically, the gateway service 222 transmits a separate request to the resource management service 224 to determine whether or not the computing device 226 is authorized to access one or more resources (e.g., a specific edge device) identified in the subscription request and/or whether or not the computing device 226 is authorized to subscribe to the type of update specified in the subscription request.

After receiving the request to verify access from the gateway service 222, the resource management service 224 performs an operation 206 that confirms that the computing device 226 is authorized to access the resource(s) and/or subscribe to the type of update specified in the subscription request. For example, the resource management service 224 could receive authentication credentials and/or an identifier for the computing device 226 from the gateway service 222 in operation 204. The resource management service 224 could match the authentication credentials and/or identifier to a list of edge devices, types of updates, and/or other resources to which the computing device 226 has been granted access. The resource management service 224 could also verify that the edge device and/or type of update specified in the subscription request from the computing device 226 are included in the list of resources. The resource management service 224 could then transmit a response to the gateway service 222 confirming that the computing device 226 is allowed to access the resource(s) associated with the subscription request.

Once access to the resource(s) associated with the subscription request is confirmed, the gateway service 222 performs an operation 208 that establishes a web socket connection with the computing device 226. This web socket connection is used to transmit messages that include updates to which the computing device 226 has subscribed, as described in further detail below with respect to FIG. 3. If the computing device 226 already has existing subscriptions to other types of updates associated with the resource management service 224, the gateway service 222 omits the operation 208 and uses an existing web socket connection to the computing device 226, created subsequent to a previous subscription by the computing device 226, to transmit messages to the computing device 226.

The gateway service 222 additionally performs an operation 210 that creates a subscription based on the attributes in the subscription request. For example, the gateway service 222 could create a database record, object, mapping, and/or another representation of the subscription in memory and/or in one or more data stores. The representation could include fields that specify an identifier for the subscription, an identifier for the computing device 226, an identifier for the edge device to which the computing device 226 has subscribed, the type of update to which the computing device 226 has subscribed, an identifier for the web socket connection to the computing device 226 (e.g., a web socket connection created in operation 208 or subsequent to a previous subscription by the computing device 226), and/or other attributes that can be used to manage the subscription and/or transmit messages related to the subscription to the computing device 226.

The gateway service 222 may then perform an operation 212 that transmits a response confirming the subscription to the computing device 226. For example, the gateway service 222 could transmit a confirmation message to the computing device 226 that includes the identifier for the subscription, the identifier for the subscription request, the identifier of the edge device to which the computing device 226 has subscribed, the identifier for the web socket connection, the type of update to which the computing device 226 has subscribed, and/or other attributes that are relevant to the newly created subscription.

Figure 3:
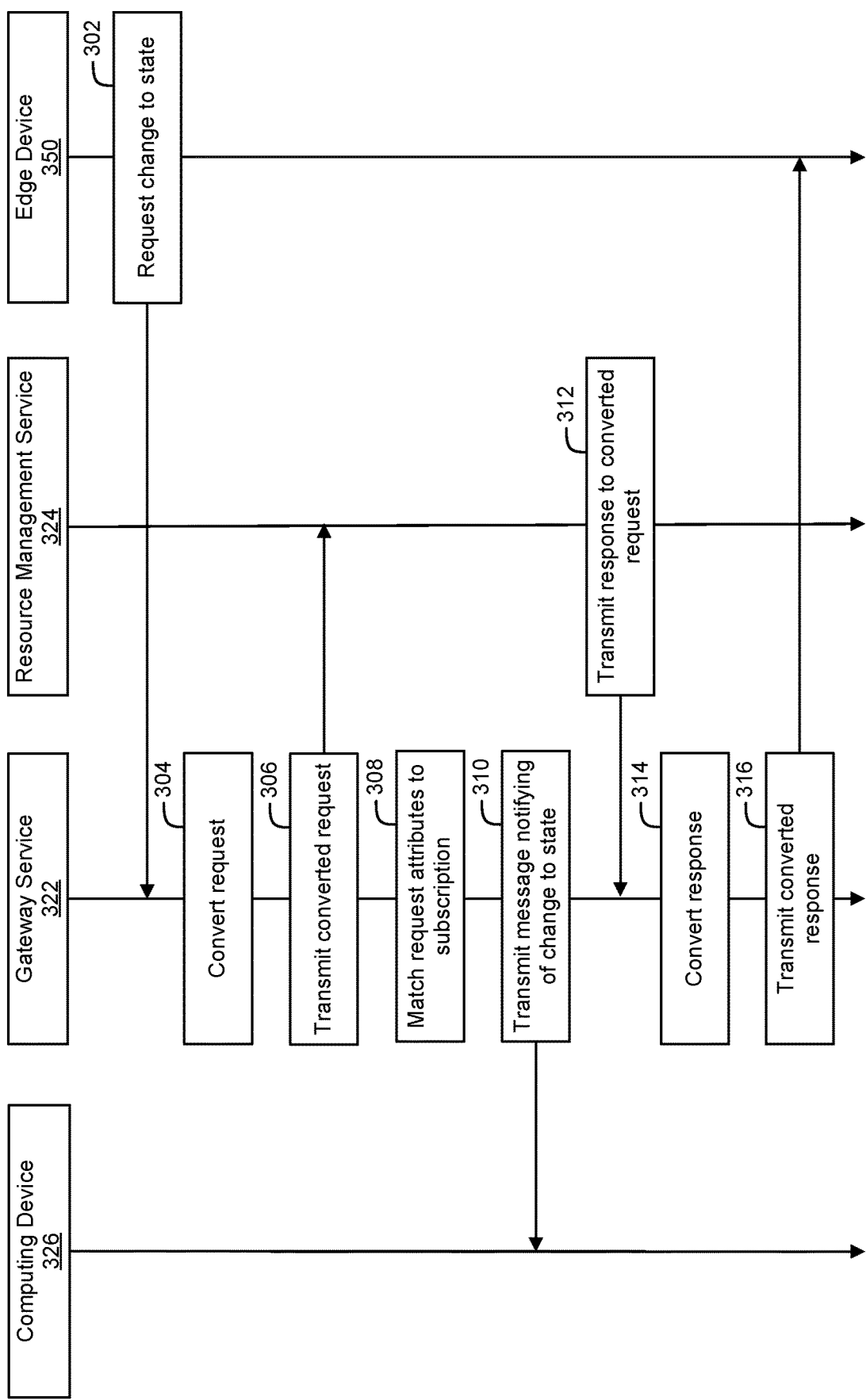
FIG. 3 illustrates an example sequence of operations involved in processing a request to change to a state associated with an edge device.

FIG. 3 illustrates an example sequence of operations 302-316 involved in processing a request to change to a state associated with an edge device 350. As shown in FIG. 3, the sequence of operations includes a first operation 302, which is performed by the edge device 350 to transmit the request to change the state associated with the edge device 350 to the gateway service 322. For example, the edge device 350 could transmit a request to the gateway service 322 to perform tasks such as registering or unregistering with a data intake and query system; toggling the edge device 350 between an "enabled" state and a "disabled" state; initiating or ending anomaly detection on the edge device 350; making heartbeat requests (e.g., to inform the resource management service 324 that the edge device 150 is healthy) associated with the edge device 150; starting, stopping, connecting or disconnecting one or more sensors coupled to the edge device 350; changing a setting or configuration on the edge device 350; updating or rebooting software on the edge device 350; and/or performing other actions related to states associated with the edge device 350 and/or sensors coupled to the edge device 350.

Further, while operation 302 is performed by the edge device 350 in the example of FIG. 3, the gateway service 322, the resource management service 324, and/or the data intake and query system can be configured to process requests from other devices to change the state associated with the edge device 350. For example, the gateway service 322, the resource management service 324, and/or the data intake and query system could process requests to change the state associated with the edge device 350 from one or more computing devices, another edge device, and/or other entities or devices that are authorized to change the state associated with the edge device 350.

Similarly, the gateway service 322, the resource management service 324, and/or the data intake and query system can be configured to process requests to change the state associated with other types of resources. For example, the gateway service 322, the resource management service 324, and/or the data intake and query system could process requests to change the state associated with a computing device, a service endpoint in the gateway service 322 and/or the resource management service 324, one or more components of the data intake and query system, and/or other resources that are managed via the gateway service 322, the resource management service 324, and/or the data intake and query system.

After receiving the request from the edge device 350, the gateway service 322 performs an operation 304 to convert the request into a format that is compatible with the interface provided by the resource management service 324. For example, the translation layer in the gateway service 322 could use a mapping between a first schema associated with a first interface provided by the gateway service and a second schema associated with a second interface provided by the resource management service 324 to convert headers, fields, and/or other data associated with the request from the edge device 350 into the format that is compatible with the second interface.

The gateway service 322 then performs an operation 306 to transmit the converted request to the resource management service 324. Continuing with the above example, the gateway service 322 could transmit the converted request to the second interface provided by the resource management service 324.

The gateway service 322 also performs an operation 308 that matches the attributes of the request from the edge device 350 to a subscription associated with the computing device 326. For example, the gateway service 322 could perform a lookup of a data store of a set of subscriptions that match the type of update, the identifier for the edge device 350, and/or other fields specified in the request.

The gateway service 322 then performs an operation 310 that transmits a message notifying the computing device 326 of the change to state associated with the edge device 350. For example, the gateway service 322 could transmit the message over the first interface provided by the gateway service 322. The message could include the time at which the request to change the state was received from the edge device 350, an identifier for the request to change the state, the identifier for the edge device 350, the type of change specified in the request, and/or other data related to the request to change the state associated with the edge device 350.

After receiving the converted request from the gateway service 322 over the interface 108, the resource management service 324 processes the converted request. For example, the resource management service 324 could apply the change to the state associated with the edge device 350 that is specified in the converted request.

The resource management service 324 also performs an operation 312 that transmits a response to the converted request to the gateway service 322. For example, the resource management service 324 could transmit the response to the gateway service 322 over the second interface provided by the resource management service 324. The response could include the identifier for the converted request (which can be the same as or different from the identifier for the original request from the edge device 350), the identifier for the edge device 350, the type of change specified in the converted request, the outcome of processing the converted request (e.g., successful or unsuccessful completion of the converted request, any errors or failures encountered during processing of the converted request, etc.), and/or other data related to the processing of the converted request by the resource management service 324.

The gateway service 322 performs an operation 314 that converts the response from the resource management service 324 into a format that is compatible with the first interface implemented by the gateway service 322. The gateway service 322 may then perform an operation 316 that transmits the converted response to the edge device 350. After the converted response is received by the edge device 350, processing related to the request to change the state from the edge device 350 is complete.

While the example sequence of operations 302-316 illustrated in FIG. 3 indicates that the gateway service 322 notifies the computing device 326 of the change to the state associated with the edge device 350 after the converted request is transmitted to the resource management service 324, it will be appreciated that the gateway service 322 can transmit one or more messages notifying the computing device 326 (and/or other subscribers) of events related to the change of state associated with the edge device 350 at one or more other times. For example, the gateway service 322 could transmit a message notifying the computing device 326 of the change to state associated with the edge device 350 after the request to change the state is received from the edge device 350, after the response to the converted request is received from the resource management service 324, and/or after the converted response is transmitted by the gateway service 322 to the edge device 350. The message could additionally include the outcome of processing the request from the edge device 350 and/or other information related to the way in which the request was processed by the gateway service 322 and/or the resource management service 324.

Figure 4:
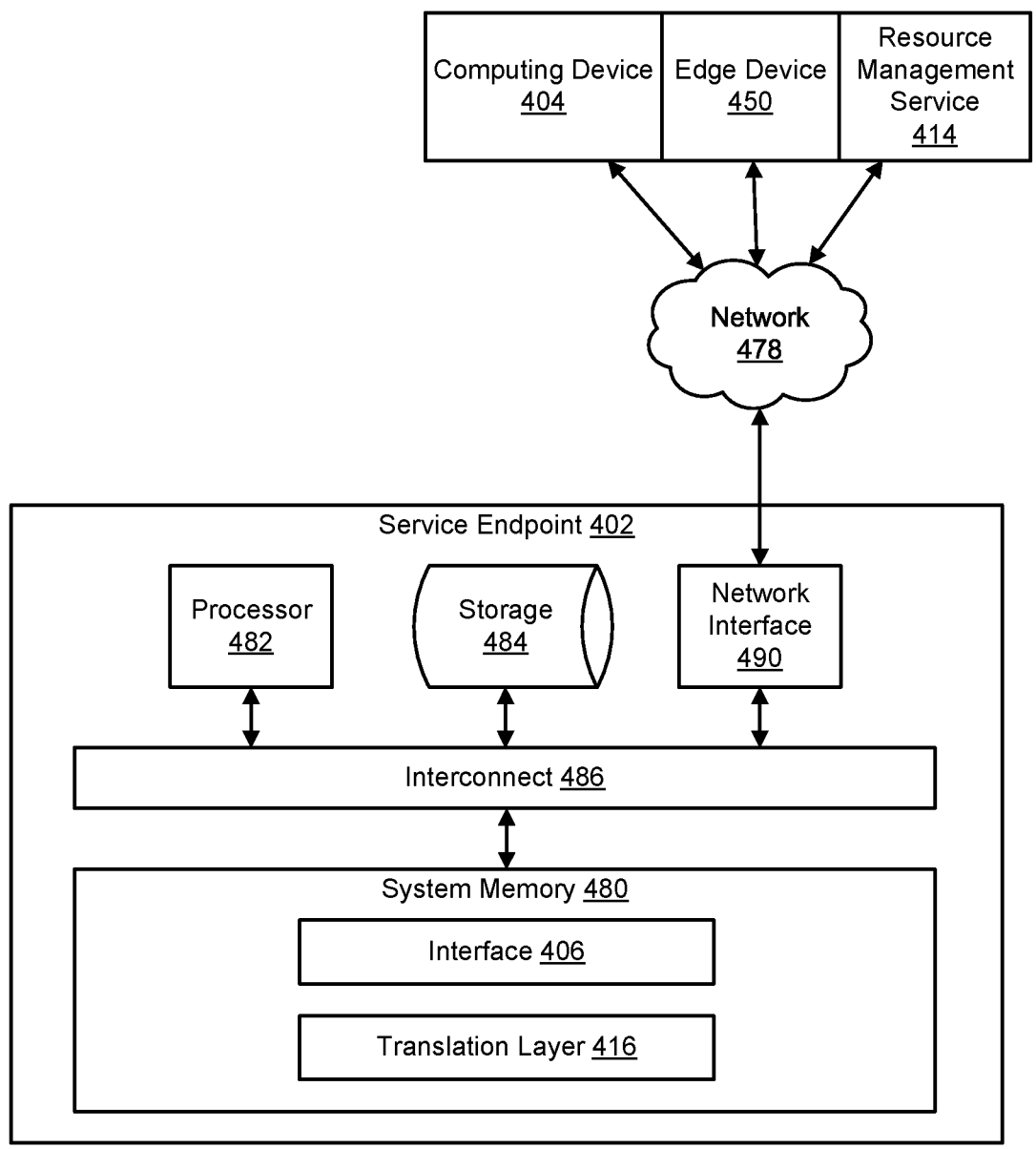
FIG. 4 illustrates a block diagram of an example service endpoint within a data processing environment.

FIG. 4 illustrates a block diagram of an example service endpoint 402 within a data processing environment 400. As shown, the data processing environment 400 may include, without limitation, the service endpoint 402, a computing device 404, an edge device 450, and a resource management service 414 communicating with one another over one or more communications networks 478. The service endpoint 402 may include, without limitation, a processor 482, storage 484, a network interface 490, an interconnect 486, and a system memory 480. The system memory 480 may include an interface 406 and a translation layer 416. Consequently, the service endpoint 402 can be used to implement a gateway service (e.g., the gateway service 112 of FIG. 1).

In general, the processor 482 retrieves and executes programming instructions stored in the system memory 480, such instructions for implementing the interface 106, the translation layer 116, and/or any operating system stored therein. The processor 482 may be any technically feasible form of a processing device configured to process data and execute program code. For example, the processor 482 could be a central processing unit (CPU), a virtualized CPU (vCPU), a graphics processing unit (GPU), an application-specific integrated circuit (ASIC), a field-programmable gate array (FPGA), and so forth. The processor 482 stores and retrieves application data residing in the system memory 480. The processor 482 is included to be representative of a single CPU, multiple CPUs, a single CPU having multiple processing cores, and so on. In operation, the processor 482 is the manager processor of the edge device 450, controlling and coordinating operations of the other system components.

The storage 484 may be a disk drive storage device. Although shown as a single unit, the storage 484 may be a combination of fixed and/or removable storage devices, such as fixed disc drives, floppy disc drives, tape drives, removable memory cards, or optical storage, network attached storage (NAS), or a storage area-network (SAN). The processor 482 may communicate to other computing devices and systems via the network interface 490, where the network interface 490 is configured to transmit and receive data via the communications network 478.

The interconnect 486 facilitates transmission, such as of programming instructions and application data, between the processor 482, the storage 484, the network interface 490, and the system memory 480.

The service endpoint 402 may use the interface 406 and the translation layer 416 to communicate with other devices within the data processing environment 600. For example, the interface 406 could be used to receive requests from the computing device 404, the edge device 450, and/or the resource management service 414. The interface 406 could also be used to process and manage requests for subscriptions to updates made via the resource management service 414 and/or transmit messages notifying subscribed clients of the corresponding updates. The translation layer 416 could be used to convert between requests and responses associated with the interface 406 and corresponding requests and responses associated with the interface provided by the resource management service 414.

Figure 5:
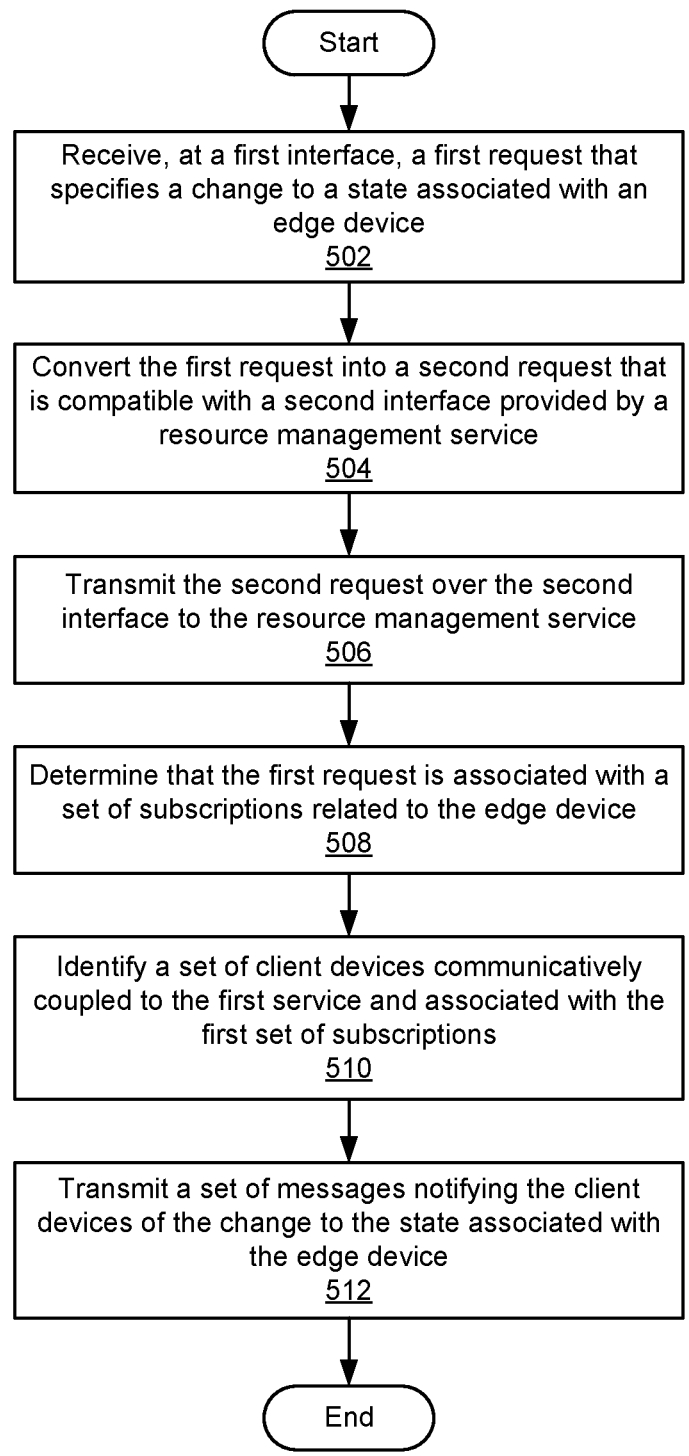
FIG. 5 sets forth a flow diagram of a process that includes method steps for processing a request associated with a resource.

FIG. 5 sets forth a flow diagram of a process 500 that includes method steps for processing a request associated with a resource. Although the method steps are described in conjunction with the systems of FIGS. 1-4, persons skilled in the art will understand that any system configured to perform the method steps in any order falls within the scope of the present disclosure.

As shown, in step 502, a gateway service receives, at a first interface, a first request that specifies a change to a state associated with an edge device. For example, the gateway service could receive the first request from the edge device, a computing device that is used to track and/or manage the operation of the edge device, and/or another device that is authorized to change the state associated with the edge device. The change to the state specified in the first request can include (but is not limited to) registering the edge device, unregistering the edge device, starting a sensor coupled to the edge device, stopping a sensor coupled to the edge device, connecting a sensor coupled to the edge device, disconnecting a sensor coupled to the edge device, changing an upload rate associated with the edge device, updating a setting associated with the edge device, rebooting the edge device, updating the software on the edge device, and/or shutting down the edge device.

In step 504, the gateway service converts the first request into a second request that is compatible with a second interface provided by a resource management service. For example, the gateway service could convert a set of headers and/or the format of the first request into a corresponding set of headers and/or a corresponding format of the second request. The gateway service could also add a request identifier from the first request to the second request to facilitate tracking of processing related to the service request.

In step 506, the gateway service transmits the second request over the second interface to the resource management service. For example, the gateway service could transmit the second request over a REST API to a REST endpoint associated with the resource management service. The second request could then be processed by the REST endpoint to effect the change specified in the first request. The REST endpoint could also transmit a response to the second request to the gateway service, and the gateway service could convert the response into a format that is compatible with the first interface before transmitting the converted response over the first interface to the source of the first request (not shown in FIG. 5).

In step 508, the gateway service determines that the first request is associated with a set of subscriptions related to the edge device. For example, each subscription could include metadata such as (but not limited to) a subscription identifier, an identifier for the edge device, a web socket identifier for a web socket connection with the corresponding client device, or a type of update associated with the subscription. To create each subscription, the gateway service receives a subscription request from a corresponding client device, verifies that the client device is authorized to access one or more resources associated with the subscription request, and creates a subscription for the client device. After the first request is received, the gateway service could identify the set of subscriptions associated with the first request by determining that each of the subscriptions includes the type of the first request, the change specified in the first request, an identifier for the edge device in the first request, and/or other attributes of the first request.

In step 510, the gateway service identifies a set of client devices communicatively coupled to the first service and associated with the set of subscriptions. For example, the gateway service could retrieve identifiers for the client devices and/or identifiers for web socket connections with the client devices from the set of subscriptions.

In step 512, the gateway service transmits a set of messages notifying the client devices of the change to the state associated with the edge device. For example, the gateway service could populate each of the messages with the identifier of the edge device, the time at which the first request was received, the time at which the change to the state was made, the status of the change (e.g., successful, unsuccessful, any errors encountered, any failures encountered, etc.), the identifier of the first request, and/or other data that is relevant to the notification of the client devices of the change to the state associated with the edge device. The gateway service could then transmit each message over a web socket connection to a corresponding client device. This web socket connection could additionally be used by the gateway service to transmit additional messages related to other subscriptions by the client device (e.g., subscriptions by the client device to other edge devices, subscriptions by the client device to other types of changes or updates, etc.).

The example process 500 can be implemented, for example, by a computing device that comprises a processor and a non-transitory computer-readable medium. The non-transitory computer readable medium can be storing instructions that, when executed by the processor, can cause the processor to perform the operations of the illustrated process 500. Alternatively or additionally, the process 500 can be implemented using a non-transitory computer-readable medium storing instructions that, when executed by one or more processors, case the one or more processors to perform the operations of the process 500 of FIG. 5.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 6:
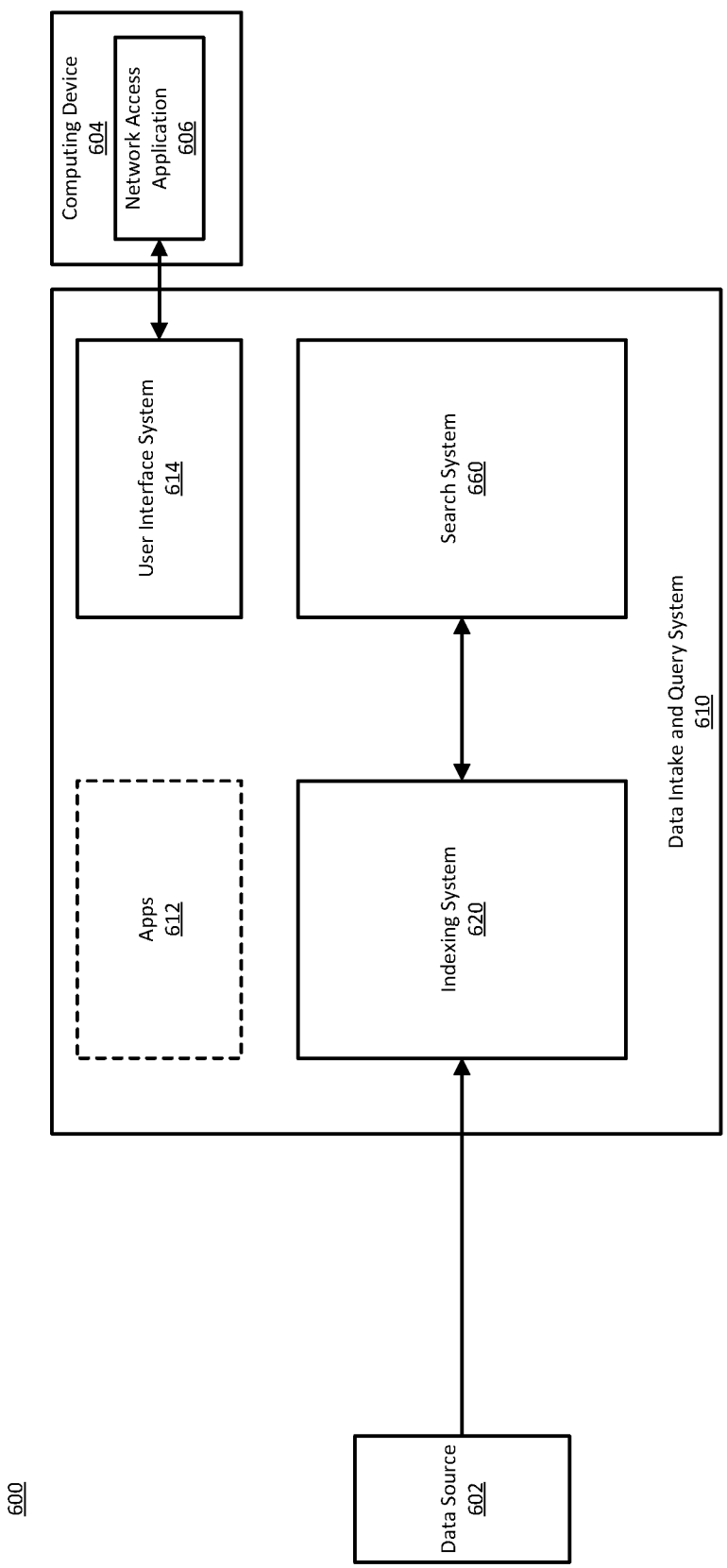
FIG. 6 is a block diagram illustrating an example computing environment that includes a data intake and query system.

FIG. 6 is a block diagram illustrating an example computing environment 600 that includes a data intake and query system 610. The data intake and query system 610 obtains data from a data source 602 in the computing environment 600, and ingests the data using an indexing system 620. A search system 660 of the data intake and query system 610 enables users to navigate the indexed data. Though drawn with separate boxes in FIG. 6, in some implementations the indexing system 620 and the search system 660 can have overlapping components. A computing device 604, running a network access application 606, can communicate with the data intake and query system 610 through a user interface system 614 of the data intake and query system 610. Using the computing device 604, a user can perform various operations with respect to the data intake and query system 610, such as administration of the data intake and query system 610, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 610 can further optionally include apps 612 that extend the search, analytics, and/or visualization capabilities of the data intake and query system 610.

The data intake and query system 610 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 610 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 610 can be executed on a single computing device, or execution of the program code can be distributed over multiple computing devices. For example, the program code can include instructions for both indexing and search components (which may be part of the indexing system 620 and/or the search system 660, respectively), which can be executed on a computing device that also provides the data source 602. As another example, the program code can be executed on one computing device, where execution of the program code provides both indexing and search components, while another copy of the program code executes on a second computing device that provides the data source 602. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 602 of the computing environment 600 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 602 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 620 obtains machine date from the data source 602 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 620 does not require prior knowledge of the structure of incoming data (e.g., the indexing system 620 does not need to be provided with a schema describing the data). Additionally, the indexing system 620 retains a copy of the data as it was received by the indexing system 620 such that the original data is always available for searching (e.g., no data is discarded, though, in some examples, the indexing system 620 can be configured to do so).

The search system 660 searches the data stored by the indexing system 620. As discussed in greater detail below, the search system 660 enables users associated with the computing environment 600 (and possibly also other users) to navigate the data, generate reports, and visualize search results in "dashboards" output using a graphical interface. Using the facilities of the search system 660, users can obtain insights about the data, such as retrieving events from an index, calculating metrics, searching for specific conditions within a rolling time window, identifying patterns in the data, and predicting future trends, among other examples. To achieve greater efficiency, the search system 660 can apply map-reduce methods to parallelize searching of large volumes of data. Additionally, because the original data is available, the search system 660 can apply a schema to the data at search time. This allows different structures to be applied to the same data, or for the structure to be modified if or when the content of the data changes. Application of a schema at search time may be referred to herein as a late-binding schema technique.

The user interface system 614 provides mechanisms through which users associated with the computing environment 600 (and possibly others) can interact with the data intake and query system 610. These interactions can include configuration, administration, and management of the indexing system 620, initiation and/or scheduling of queries that are to be processed by the search system 660, receipt or reporting of search results, and/or visualization of search results. The user interface system 614 can include, for example, facilities to provide a command line interface or a web-based interface.

Users can access the user interface system 614 using a computing device 604 that communicates with data intake and query system 610, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 600. For example, a person can log in as a particular user and, using the user's digital information, can access the data intake and query system 610. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 604 can provide a human-machine interface through which a person can have a digital presence in the computing environment 600 in the form of a user. The computing device 604 is an electronic device having one or more processors and a memory capable of storing instructions for execution by the one or more processors. The computing device 604 can further include input/output (I/O) hardware and a network interface. Applications executed by the computing device 604 can include a network access application 606, such as a web browser, which can use a network interface of the client computing device 604 to communicate, over a network, with the user interface system 614 of the data intake and query system 610. The user interface system 614 can use the network access application 606 to generate user interfaces that enable a user to interact with the data intake and query system 610. A web browser is one example of a network access application. A shell tool can also be used as a network access application. In some examples, the data intake and query system 610 is an application executing on the computing device 604. In such examples, the network access application 606 can access the user interface system 614 without going over a network.

The data intake and query system 610 can optionally include apps 612. An app of the data intake and query system 610 is a collection of configurations, knowledge objects (a user-defined entity that enriches the data in the data intake and query system 610), views, and dashboards that may provide additional functionality, different techniques for searching the data, and/or additional insights into the data. The data intake and query system 610 can execute multiple applications simultaneously. Example applications include an information technology service intelligence application, which can monitor and analyze the performance and behavior of the computing environment 600, and an enterprise security application, which can include content and searches to assist security analysts in diagnosing and acting on anomalous or malicious behavior in the computing environment 600.

Though FIG. 6 illustrates only one data source, in practical implementations, the computing environment 600 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 600, the data intake and query system 610 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 600 can include on-prem and cloud-based computing resources, or only cloud-based resources. For example, an entity may have on-prem computing devices and a private cloud. In this example, the entity operates the data intake and query system 610 and can choose to execute the data intake and query system 610 on an on-prem computing device or in the cloud. In another example, a provider entity operates the data intake and query system 610 in a public cloud and provides the functionality of the data intake and query system 610 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 610. In some implementations, the entity providing the data intake and query system 610 is itself subscribing to the cloud services of a cloud service provider. As an example, a first entity provides computing resources under a public cloud service model, a second entity subscribes to the cloud services of the first provider entity and uses the cloud computing resources to operate the data intake and query system 610, and a third entity can subscribe to the services of the second provider entity in order to use the functionality of the data intake and query system 610. In this example, the data sources are associated with the third entity, users accessing the data intake and query system 610 are associated with the third entity, and the analytics and insights provided by the data intake and query system 610 are for purposes of the third entity's operations.

Figure 7:
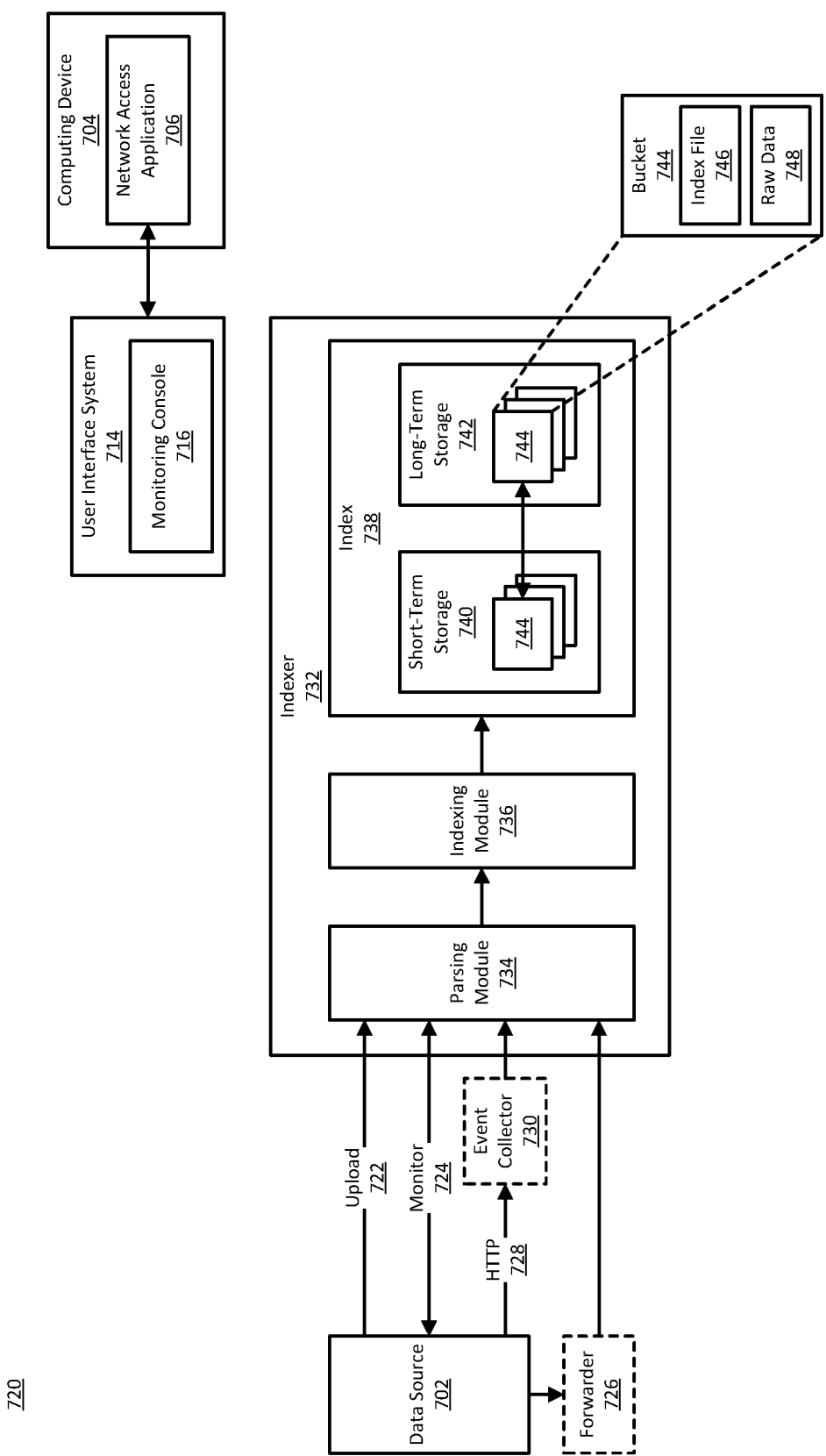
FIG. 7 is a block diagram illustrating in greater detail an example of an indexing system of a data intake and query system.

FIG. 7 is a block diagram illustrating in greater detail an example of an indexing system 720 of a data intake and query system, such as the data intake and query system 610 of FIG. 6. The indexing system 720 of FIG. 7 uses various methods to obtain machine data from a data source 702 and stores the data in an index 738 of an indexer 732. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 720 enables the data intake and query system to obtain the machine data produced by the data source 702 and to store the data for searching and retrieval.

Users can administer the operations of the indexing system 720 using a computing device 704 that can access the indexing system 720 through a user interface system 714 of the data intake and query system. For example, the computing device 704 can be executing a network access application 706, such as a web browser or a terminal, through which a user can access a monitoring console 716 provided by the user interface system 714. The monitoring console 716 can enable operations such as: identifying the data source 702 for data ingestion; configuring the indexer 732 to index the data from the data source 702; configuring a data ingestion method; configuring, deploying, and managing clusters of indexers; and viewing the topology and performance of a deployment of the data intake and query system, among other operations. The operations performed by the indexing system 720 may be referred to as "index time" operations, which are distinct from "search time" operations that are discussed further below.

The indexer 732, which may be referred to herein as a data indexing component, coordinates and performs most of the index time operations. The indexer 732 can be implemented using program code that can be executed on a computing device. The program code for the indexer 732 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 732. In some implementations, the indexer 732 executes on the computing device 704 through which a user can access the indexing system 720. In some implementations, the indexer 732 executes on a different computing device than the illustrated computing device 704.

The indexer 732 may be executing on the computing device that also provides the data source 702 or may be executing on a different computing device. In implementations wherein the indexer 732 is on the same computing device as the data source 702, the data produced by the data source 702 may be referred to as "local data." In other implementations the data source 702 is a component of a first computing device and the indexer 732 executes on a second computing device that is different from the first computing device. In these implementations, the data produced by the data source 702 may be referred to as "remote data." In some implementations, the first computing device is "on-prem" and in some implementations the first computing device is "in the cloud." In some implementations, the indexer 732 executes on a computing device in the cloud and the operations of the indexer 732 are provided as a service to entities that subscribe to the services provided by the data intake and query system.

For a given data produced by the data source 702, the indexing system 720 can be configured to use one of several methods to ingest the data into the indexer 732. These methods include upload 722, monitor 724, using a forwarder 726, or using HyperText Transfer Protocol (HTTP 728) and an event collector 730. These and other methods for data ingestion may be referred to as "getting data in" (GDI) methods.

Using the upload 722 method, a user can specify a file for uploading into the indexer 732. For example, the monitoring console 716 can include commands or an interface through which the user can specify where the file is located (e.g., on which computing device and/or in which directory of a file system) and the name of the file. The file may be located at the data source 702 or maybe on the computing device where the indexer 732 is executing. Once uploading is initiated, the indexer 732 processes the file, as discussed further below. Uploading is a manual process and occurs when instigated by a user. For automated data ingestion, the other ingestion methods are used.

The monitor 724 method enables the indexing system 720 to monitor the data source 702 and continuously or periodically obtain data produced by the data source 702 for ingestion by the indexer 732. For example, using the monitoring console 716, a user can specify a file or directory for monitoring. In this example, the indexing system 720 can execute a monitoring process that detects whenever the file or directory is modified and causes the file or directory contents to be sent to the indexer 732. As another example, a user can specify a network port for monitoring. In this example, a monitoring process can capture data received at or transmitting from the network port and cause the data to be sent to the indexer 732. In various examples, monitoring can also be configured for data sources such as operating system event logs, performance data generated by an operating system, operating system registries, operating system directory services, and other data sources.

Monitoring is available when the data source 702 is local to the indexer 732 (e.g., the data source 702 is on the computing device where the indexer 732 is executing). Other data ingestion methods, including forwarding and the event collector 730, can be used for either local or remote data sources.

A forwarder 726, which may be referred to herein as a data forwarding component, is a software process that sends data from the data source 702 to the indexer 732. The forwarder 726 can be implemented using program code that can be executed on the computer device that provides the data source 702. A user launches the program code for the forwarder 726 on the computing device that provides the data source 702. The user can further configure the forwarder 726, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 726 can provide various capabilities. For example, the forwarder 726 can send the data unprocessed or can perform minimal processing on the data before sending the data to the indexer 732. Minimal processing can include, for example, adding metadata tags to the data to identify a source, source type, and/or host, among other information, dividing the data into blocks, and/or applying a timestamp to the data. In some implementations, the forwarder 726 can break the data into individual events (event generation is discussed further below) and send the events to a receiver. Other operations that the forwarder 726 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 730 provides an alternate method for obtaining data from the data source 702. The event collector 730 enables data and application events to be sent to the indexer 732 using HTTP 728. The event collector 730 can be implemented using program code that can be executing on a computing device. The program code may be a component of the data intake and query system or can be a standalone component that can be executed independently of the data intake and query system and operates in cooperation with the data intake and query system.

To use the event collector 730, a user can, for example using the monitoring console 716 or a similar interface provided by the user interface system 714, enable the event collector 730 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 702 as an alternative method to using a username and password for authentication.

To send data to the event collector 730, the data source 702 is supplied with a token and can then send HTTP 728 requests to the event collector 730. To send HTTP 728 requests, the data source 702 can be configured to use an HTTP client and/or to use logging libraries such as those supplied by Java, JavaScript, and .NET libraries. An HTTP client enables the data source 702 to send data to the event collector 730 by supplying the data, and a Uniform Resource Identifier (URI) for the event collector 730 to the HTTP client. The HTTP client then handles establishing a connection with the event collector 730, transmitting a request containing the data, closing the connection, and receiving an acknowledgment if the event collector 730 sends one. Logging libraries enable HTTP 728 requests to the event collector 730 to be generated directly by the data source. For example, an application can include or link a logging library, and through functionality provided by the logging library manage establishing a connection with the event collector 730, transmitting a request, and receiving an acknowledgement.

An HTTP 728 request to the event collector 730 can contain a token, a channel identifier, event metadata, and/or event data. The token authenticates the request with the event collector 730. The channel identifier, if available in the indexing system 720, enables the event collector 730 to segregate and keep separate data from different data sources. The event metadata can include one or more key-value pairs that describe the data source 702 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 730 extracts events from HTTP 728 requests and sends the events to the indexer 732. The event collector 730 can further be configured to send events to one or more indexers. Extracting the events can include associating any metadata in a request with the event or events included in the request. In these implementations, event generation by the indexer 732 (discussed further below) is bypassed, and the indexer 732 moves the events directly to indexing. In some implementations, the event collector 730 extracts event data from a request and outputs the event data to the indexer 732, and the indexer generates events from the event data. In some implementations, the event collector 730 sends an acknowledgement message to the data source 702 to indicate that the event collector 730 has received a particular request form the data source 702, and/or to indicate to the data source 702 that events in the request have been added to an index.

The indexer 732 ingests incoming data and transforms the data into searchable knowledge in the form of events. In the data intake and query system, an event is a single piece of data that represents activity of the component represented in FIG. 7 by the data source 702. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 732 can include a parsing module 734 and an indexing module 736 for generating and storing the events. The parsing module 734 and indexing module 736 can be modular and pipelined, such that one component can be operating on a first set of data while the second component is simultaneously operating on a second sent of data. Additionally, the indexer 732 may at any time have multiple instances of the parsing module 734 and indexing module 736, with each set of instances configured to simultaneously operate on data from the same data source or from different data sources. The parsing module 734 and indexing module 736 are illustrated in FIG. 7 to facilitate discussion, with the understanding that implementations with other components are possible to achieve the same functionality.

The parsing module 734 determines information about incoming event data, where the information can be used to identify events within the event data. For example, the parsing module 734 can associate a source type with the event data. A source type identifies the data source 702 and describes a possible data structure of event data produced by the data source 702. For example, the source type can indicate which fields to expect in events generated at the data source 702 and the keys for the values in the fields, and possibly other information such as sizes of fields, an order of the fields, a field separator, and so on. The source type of the data source 702 can be specified when the data source 702 is configured as a source of event data. Alternatively, the parsing module 734 can determine the source type from the event data, for example from an event field in the event data or using machine learning techniques applied to the event data.

Other information that the parsing module 734 can determine includes timestamps. In some cases, an event includes a timestamp as a field, and the timestamp indicates a point in time when the action represented by the event occurred or was recorded by the data source 702 as event data. In these cases, the parsing module 734 may be able to determine from the source type associated with the event data that the timestamps can be extracted from the events themselves. In some cases, an event does not include a timestamp and the parsing module 734 determines a timestamp for the event, for example from a name associated with the event data from the data source 702 (e.g., a file name when the event data is in the form of a file) or a time associated with the event data (e.g., a file modification time). As another example, when the parsing module 734 is not able to determine a timestamp from the event data, the parsing module 734 may use the time at which it is indexing the event data. As another example, the parsing module 734 can use a user-configured rule to determine the timestamps to associate with events.

The parsing module 734 can further determine event boundaries. In some cases, a single line (e.g., a sequence of characters ending with a line termination) in event data represents one event while in other cases, a single line represents multiple events. In yet other cases, one event may span multiple lines within the event data. The parsing module 734 may be able to determine event boundaries from the source type associated with the event data, for example from a data structure indicated by the source type. In some implementations, a user can configure rules the parsing module 734 can use to identify event boundaries.

The parsing module 734 can further extract data from events and possibly also perform transformations on the events. For example, the parsing module 734 can extract a set of fields (key-value pairs) for each event, such as a host or hostname, source or source name, and/or source type. The parsing module 734 may extract certain fields by default or based on a user configuration. Alternatively or additionally, the parsing module 734 may add fields to events, such as a source type or a user-configured field. As another example of a transformation, the parsing module 734 can anonymize fields in events to mask sensitive information, such as social security numbers or account numbers. Anonymizing fields can include changing or replacing values of specific fields. The parsing module 734 can further perform user-configured transformations.

The parsing module 734 outputs the results of processing incoming event data to the indexing module 736, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 732 can be configured to identify searchable segments that are parts of fields, searchable segments that are entire fields, or both. The parsing module 734 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 746, to find event data that matches a search query. In some implementations, segmentation can alternatively be performed by the forwarder 726. Segmentation can also be disabled, in which case the indexer 732 will not build a lexicon for the event data. When segmentation is disabled, the search system searches the event data directly.

Building index data structures generates the index 738. The index 738 is a storage data structure on a storage device (e.g., a disk drive or other physical device for storing digital data). The storage device may be a component of the computing device on which the indexer 732 is operating (referred to herein as local storage) or may be a component of a different computing device (referred to herein as remote storage) that the indexer 738 has access to over a network. The indexer 732 can manage more than one index and can manage indexes of different types. For example, the indexer 732 can manage event indexes, which impose minimal structure on stored data and can accommodate any type of data. As another example, the indexer 732 can manage metrics indexes, which use a highly structured format to handle the higher volume and lower latency demands associated with metrics data.

The indexing module 736 organizes files in the index 738 in directories referred to as buckets. The files in a bucket 744 can include raw data files, index files, and possibly also other metadata files. As used herein, "raw data" means data as when the data was produced by the data source 702, without alteration to the format or content. As noted previously, the parsing module 734 may add fields to event data and/or perform transformations on fields in the event data. Event data that has been altered in this way is referred to herein as enriched data. A raw data file 748 can include enriched data, in addition to or instead of raw data. The raw data file 748 may be compressed to reduce disk usage. An index file 746, which may also be referred to herein as a "time-series index" or tsidx file, contains metadata that the indexer 732 can use to search a corresponding raw data file 748. As noted above, the metadata in the index file 746 includes a lexicon of the event data, which associates each unique keyword in the event data with a reference to the location of event data within the raw data file 748. The keyword data in the index file 746 may also be referred to as an inverted index. In various implementations, the data intake and query system can use index files for other purposes, such as to store data summarizations that can be used to accelerate searches.

A bucket 744 includes event data for a particular range of time. The indexing module 736 arranges buckets in the index 738 according to the age of the buckets, such that buckets for more recent ranges of time are stored in short-term storage 740 and buckets for less recent ranges of time are stored in long-term storage 742. Short-term storage 740 may be faster to access while long-term storage 742 may be slower to access. Buckets may be moves from short-term storage 740 to long-term storage 742 according to a configurable data retention policy, which can indicate at what point in time a bucket is old enough to be moved.

A bucket's location in short-term storage 740 or long-term storage 742 can also be indicated by the bucket's status. As an example, a bucket's status can be "hot," "warm," "cold," "frozen," or "thawed." In this example, hot bucket is one to which the indexer 732 is writing data and the bucket becomes a warm bucket when the indexer 732 stops writing data to it. In this example, both hot and warm buckets reside in short-term storage 740. Continuing this example, when a warm bucket is moved to long-term storage 742, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 720 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 720 through the monitoring console 716 provided by the user interface system 714. Using the monitoring console 716, the user can configure and monitor an index cluster, and see information such as disk usage by an index, volume usage by an indexer, index and volume size over time, data age, statistics for bucket types, and bucket settings, among other information.

Figure 8:
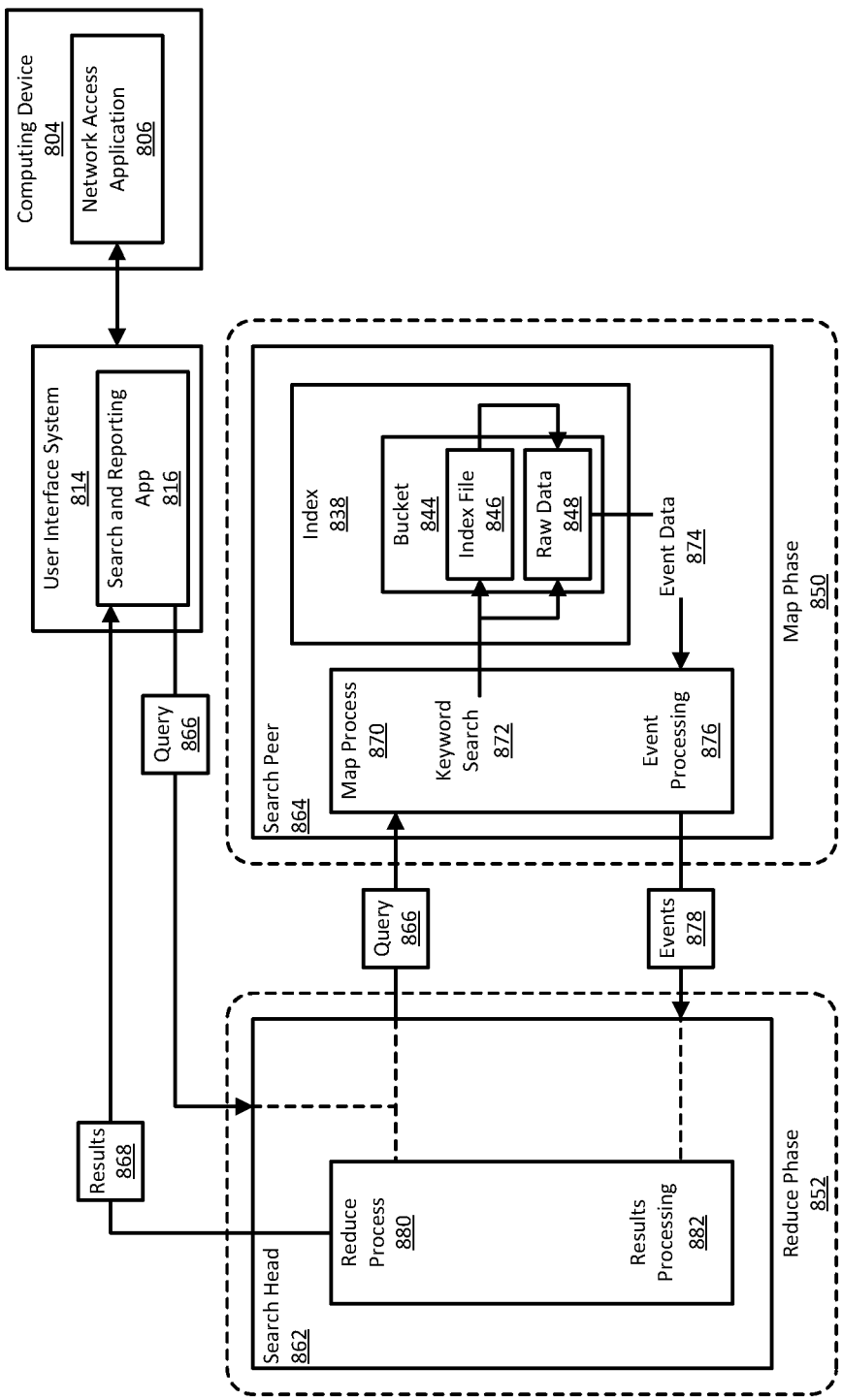
FIG. 8 is a block diagram illustrating in greater detail an example of a search system of a data intake and query system.

FIG. 8 is a block diagram illustrating in greater detail an example of the search system 860 of a data intake and query system, such as the data intake and query system 610 of FIG. 6. The search system 860 of FIG. 8 issues a query 866 to a search head 862, which sends the query 866 to a search peer 864. Using a map process 870, the search peer 864 searches the appropriate index 838 for events identified by the query 866 and sends events 878 so identified back to the search head 862. Using a reduce process 882, the search head 862 processes the events 878 and produces results 868 to respond to the query 866. The results 868 can provide useful insights about the data stored in the index 838. These insights can aid in the administration of information technology systems, in security analysis of information technology systems, and/or in analysis of the development environment provided by information technology systems.

The query 866 that initiates a search is produced by a search and reporting app 816 that is available through the user interface system 814 of the data intake and query system. Using a network access application 806 executing on a computing device 804, a user can input the query 866 into a search field provided by the search and reporting app 816. Alternatively or additionally, the search and reporting app 816 can include pre-configured queries or stored queries that can be activated by the user. In some cases, the search and reporting app 816 initiates the query 866 when the user enters the query 866. In these cases, the query 866 maybe referred to as an "ad-hoc" query. In some cases, the search and reporting app 816 initiates the query 866 based on a schedule. For example, the search and reporting app 816 can be configured to execute the query 866 once per hour, once per day, at a specific time, on a specific date, or at some other time that can be specified by a date, time, and/or frequency. These types of queries maybe referred to as scheduled queries.

The query 866 is specified using a search processing language. The search processing language includes commands or search terms that the search peer 864 will use to identify events to return in the search results 868. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 866 to include sequential commands, where a subsequent command may operate on the results of a prior command. As an example, sequential commands may be separated in the query 866 by a vertical line ("|" or "pipe") symbol.

In addition to one or more search commands, the query 866 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 866 occurs in two broad phases: a map phase 850 and a reduce phase 852. The map phase 850 takes place across one or more search peers. In the map phase 850, the search peers locate event data that matches the search terms in the search query 866 and sorts the event data into field-value pairs. When the map phase 850 is complete, the search peers send events that they have found to one or more search heads for the reduce phase 852. During the reduce phase 852, the search heads process the events through commands in the search query 866 and aggregate the events to produce the final search results 868.

A search head, such as the search head 862 illustrated in FIG. 8, is a component of the search system 860 that manages searches. The search head 862, which may also be referred to herein as a search management component, can be implemented using program code that can be executed on a computing device. The program code for the search head 862 can be stored on a non-transitory computer-readable medium and from this medium can be loaded or copied to the memory of a computing device. One or more hardware processors of the computing device can read the program code from the memory and execute the program code in order to implement the operations of the search head 862.

Upon receiving the search query 866, the search head 862 directs the query 866 to one or more search peers, such as the search peer 864 illustrated in FIG. 8. "Search peer" is an alternate name for "indexer" and a search peer may be largely similar to the indexer described previously. The search peer 864 may be referred to as a "peer node" when the search peer 864 is part of an indexer cluster. The search peer 864, which may also be referred to as a search execution component, can be implemented using program code that can be executed on a computing device. In some implementations, one set of program code implements both the search head 862 and the search peer 864 such that the search head 862 and the search peer 864 form one component. In some implementations, the search head 862 is an independent piece of code that performs searching and no indexing functionality. In these implementations, the search head 862 may be referred to as a dedicated search head.

The search head 862 may consider multiple criteria when determining whether to send the query 866 to the particular search peer 864. For example, the search system 860 may be configured to include multiple search peers that each have duplicative copies of at least some of the event data and are implanted using different hardware resources. In this example, the sending the search query 866 to more than one search peer allows the search system 860 to distribute the search workload across different hardware resources. As another example, search system 860 may include different search peers for different purposes (e.g., one has an index storing a first type of data or from a first data source while a second has an index storing a second type of data or from a second data source). In this example, the search query 866 may specify which indexes to search, and the search head 862 will send the query 866 to the search peers that have those indexes.

To identify events 878 to send back to the search head 862, the search peer 864 performs a map process 870 to obtain event data 874 from the index 838 that is maintained by the search peer 864. During a first phase of the map process 870, the search peer 864 identifies buckets that have events that are described by the time indicator in the search query 866. As noted above, a bucket contains events whose timestamps fall within a particular range of time. For each bucket 844 whose events can be described by the time indicator, during a second phase of the map process 870, the search peer 864 performs a keyword search 872 using search terms specified in the search query 866. The search terms can be one or more of keywords, phrases, fields, Boolean expressions, and/or comparison expressions that in combination describe events being searched for. When segmentation is enabled at index time, the search peer 864 performs the keyword search 872 on the bucket's index file 846. As noted previously, the index file 846 includes a lexicon of the searchable terms in the events stored in the bucket's raw data 848 file. The keyword search 872 searches the lexicon for searchable terms that correspond to one or more of the search terms in the query 866. As also noted above, the lexicon incudes, for each searchable term, a reference to each location in the raw data 848 file where the searchable term can be found. Thus, when the keyword search identifies a searchable term in the index file 846 that matches a search term in the query 866, the search peer 864 can use the location references to extract from the raw data 848 file the event data 874 for each event that include the searchable term.

In cases where segmentation was disabled at index time, the search peer 864 performs the keyword search 872 directly on the raw data 848 file. To search the raw data 848, the search peer 864 may identify searchable segments in events in a similar manner as when the data was indexed. Thus, depending on how the search peer 864 is configured, the search peer 864 may look at event fields and/or parts of event fields to determine whether an event matches the query 866. Any matching events can be added to the event data 874 read from the raw data 848 file. The search peer 864 can further be configured to enable segmentation at search time, so that searching of the index 838 causes the search peer 864 to build a lexicon in the index file 846.

The event data 874 obtained from the raw data 848 file includes the full text of each event found by the keyword search 872. During a third phase of the map process 870, the search peer 864 performs event processing 876 on the event data 874, with the steps performed being determined by the configuration of the search peer 864 and/or commands in the search query 866. For example, the search peer 864 can be configured to perform field discovery and field extraction. Field discovery is a process by which the search peer 864 identifies and extracts key-value pairs from the events in the event data 874. The search peer 864 can, for example, be configured to automatically extract the first 100 fields (or another number of fields) in the event data 874 that can be identified as key-value pairs. As another example, the search peer 864 can extract any fields explicitly mentioned in the search query 866. The search peer 864 can, alternatively or additionally, be configured with particular field extractions to perform.

Other examples of steps that can be performed during event processing 876 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 864 sends processed events 878 to the search head 862, which performs a reduce process 880. The reduce process 880 potentially receives events from multiple search peers and performs various results processing 882 steps on the received events. The results processing 882 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 882 can further include applying commands from the search query 866 to the events. The query 866 can include, for example, commands for evaluating and/or manipulating fields (e.g., to generate new fields from existing fields or parse fields that have more than one value). As another example, the query 866 can include commands for calculating statistics over the events, such as counts of the occurrences of fields, or sums, averages, ranges, and so on, of field values. As another example, the query 866 can include commands for generating statistical values for purposes of generating charts of graphs of the events.

The reduce process 880 outputs the events found by the search query 866, as well as information about the events. The search head 862 transmits the events and the information about the events as search results 868, which are received by the search and reporting app 816. The search and reporting app 816 can generate visual interfaces for viewing the search results 868. The search and reporting app 816 can, for example, output visual interfaces for the network access application 806 running on a computing device 804 to generate.

The visual interfaces can include various visualizations of the search results 868, such as tables, line or area charts, Chlorpleth maps, or single values. The search and reporting app 816 can organize the visualizations into a dashboard, where the dashboard includes a panel for each visualization. A dashboard can thus include, for example, a panel listing the raw event data for the events in the search results 868, a panel listing fields extracted at index time and/or found through field discovery along with statistics for those fields, and/or a timeline chart indicating how many events occurred at specific points in time (as indicated by the timestamps associated with each event). In various implementations, the search and reporting app 816 can provide one or more default dashboards. Alternatively or additionally, the search and reporting app 816 can include functionality that enables a user to configure custom dashboards.

The search and reporting app 816 can also enable further investigation into the events in the search results 868. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 866. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

In sum, the disclosed techniques provide a wrapper layer that tracks updates made over a target interface and generates notifications of the updates. The wrapper layer receives requests from client devices over a different interface and converts the requests into a format that is compatible with the target interface. The wrapper layer transmits each of the converted requests over the target interface for processing by a service or service endpoint providing the target interface. After the wrapper layer receives a response to a converted request over the target interface, the wrapper layer converts the response into a format that is compatible with the interface provided by the wrapper layer. The wrapper layer then transmits the converted response over the interface to the client from which the original request was received.

The wrapper layer additionally processes and manages additional requests from clients that would like to subscribe to updates associated with the target interface. After receiving a request from a client device to subscribe to a certain type of update, the wrapper layer first verifies that the client device is authorized to access a resource associated with the type of update. Next, the wrapper creates a subscription that includes metadata related to the client device and the type of update. This subscription indicates that the client device is to be notified of requests pertaining to that type of update.

When the wrapper layer receives a request corresponding to an update associated with the target interface, the wrapper layer matches one or more attributes of the request to metadata associated with a set of subscriptions by a set of client devices. For example, the wrapper layer could match the type of request, an identifier for an edge device targeted by the request, and/or other attributes or parameters of the request to subscriptions that include these attributes. The wrapper layer also uses identifiers in the subscriptions to determine a set of client devices associated with these subscriptions. The wrapper layer then transmits messages to the client devices to notify the clients of the request.

One technical advantage of the disclosed techniques relative to the prior art is that the wrapper layer is able to detect changes made via the target interface and notify subscribers of the changes in a real-time or near-real-time manner. Accordingly, the disclosed techniques allow the subscribers to be notified of the changes more quickly than prior art approaches that incur delays between changes made via an interface and the notification of clients of the changes. Another technical advantage of the disclosed techniques is that the wrapper layer can transmit notifications for a certain type of update to a client device after receiving a single request from the client device. In this regard, the disclosed techniques incur less resource overhead in processing client requests for notifications of updates made over an interface than prior art approaches that involve repeated polling of interfaces to detect changes made via the interfaces. These technical advantages provide one or more technological improvements over prior art approaches.

1. In some embodiments, a computer-implemented method comprises receiving, at a first interface provided by a first service, a first request that specifies a change to a state associated with an edge device; transmitting a second request corresponding to the first request over a second interface provided by a second service, wherein the second request is processed by the second service to apply the change to the state associated with the edge device; determining, based on one or more attributes of the first request, that the first request is associated with a first set of subscriptions related to the edge device; identifying a set of client devices communicatively coupled to the first service and associated with the first set of subscriptions; and transmitting a set of messages notifying the set of client devices of the change to the state of the edge device.
2. The computer-implemented method of clause 1, further comprising converting the first request into the second request based on a first format associated with the first interface and a second format associated with the second interface.
3. The computer-implemented method of any of clauses 1-2, further comprising converting the first request into the second request based on a first set of headers associated with the first interface and a second set of headers associated with the second interface.
4. The computer-implemented method of any of clauses 1-3, further comprising adding a request identifier from the first request to the second request prior to transmitting the second request over the second interface.
5. The computer-implemented method of any of clauses 1-4, further comprising receiving a first response to the second request from the second service; and transmitting a second response corresponding to the first response over the first interface.
6. The computer-implemented method of any of clauses 1-5, further comprising receiving a third request from a first client device to subscribe to one or more resources associated with the change to the state; and verifying that the first client device is authorized to access the one or more resources prior to updating the first set of subscriptions with a first subscription for the first client device to the one or more resources associated with the change to the state.
7. The computer-implemented method of any of clauses 1-6, wherein determining that the first request is associated with the first set of subscriptions comprises matching one or more parameters included in the first request to metadata associated with the first set of subscriptions.
8. The computer-implemented method of any of clauses 1-7, wherein determining that the first request is associated with the first set of subscriptions comprises matching a type of the first request to metadata associated with the first set of subscriptions.
9. The computer-implemented method of any of clauses 1-8, wherein identifying the set of client devices comprises retrieving a set of identifiers for the set of client devices from the first set of subscriptions.
10. The computer-implemented method of any of clauses 1-9, wherein each message included in the set of messages is transmitted over a web socket connection to a corresponding client device included in the set of client devices.
11. The computer-implemented method of any of clauses 1-10, wherein the second request is transmitted to an endpoint associated with a type of the first request.
12. The computer-implemented method of any of clauses 1-11, wherein the set of messages includes an update made by the second service in response to the second request.
13. The computer-implemented method of any of clauses 1-12, wherein the change to the state associated with the edge device comprises at least one of registering the edge device, unregistering the edge device, starting a sensor coupled to the edge device, stopping a sensor coupled to the edge device, connecting a sensor coupled to the edge device, initiating anomaly detection on the sensor coupled to the edge device, ending anomaly detection on the sensor coupled to the edge device, a heartbeat request associated with the edge device, disconnecting a sensor coupled to the edge device, changing an upload rate associated with the edge device, updating a setting associated with the edge device, rebooting the edge device, updating the edge device, or shutting down the edge device.
14. The computer-implemented method of any of clauses 1-13, wherein the second interface comprises a representational state transfer application programming interface.
15. In some embodiments, one or more non-transitory computer-readable media store instructions that, when executed by one or more processors, cause the one or more processors to perform operations including receiving, at a first interface provided by a first service, a first request that specifies a change to a state associated with an edge device; transmitting a second request corresponding to the first request over a second interface provided by a second service, wherein the second request is processed by the second service to apply the change to the state associated with the edge device; determining, based on one or more attributes of the first request, that the first request is associated with a first set of subscriptions related to the edge device; identifying a set of client devices communicatively coupled to the first service and associated with the first set of subscriptions; and transmitting a set of messages notifying the set of client devices of the change to the state of the edge device.
16. The one or more non-transitory computer-readable media of clause 15, wherein the instructions further cause the one or more processors to perform the operation of converting the first request into the second request based on a first format associated with the first interface, a second format associated with the second interface, a first set of headers associated with the first request, and a second set of headers associated with the second request.

17. The one or more non-transitory computer-readable media of any of clauses 15-16, wherein the instructions further cause the one or more processors to perform the operations of receiving a third request from a first client device to subscribe to one or more resources associated with the change to the state; and verifying that the first client device is authorized to access the one or more resources prior to updating the first set of subscriptions with a first subscription for the first client device.

18. The one or more non-transitory computer-readable media of any of clauses 15-17, wherein each subscription included in the first set of subscriptions comprises at least one of a subscription identifier, an identifier for the edge device, a web socket identifier, or a type of update associated with the subscription.

19. The one or more non-transitory computer-readable media of any of clauses 15-18, wherein the change to the state associated with the edge device comprises at least one of registering the edge device, unregistering the edge device, starting a sensor coupled to the edge device, stopping a sensor coupled to the edge device, connecting a sensor coupled to the edge device, initiating anomaly detection on the sensor coupled to the edge device, ending anomaly detection on the sensor coupled to the edge device, a heartbeat request associated with the edge device, disconnecting a sensor coupled to the edge device, changing an upload rate associated with the edge device, updating a setting associated with the edge device, rebooting the edge device, updating the edge device, or shutting down the edge device.

20. In some embodiments, a computing device comprises a processor; and a non-transitory computer-readable medium having stored thereon instructions that, when executed by the processor, cause the processor to perform operations including receiving, at a first interface provided by a first service, a first request that specifies a change to a state associated with an edge device; transmitting a second request corresponding to the first request over a second interface provided by a second service, wherein the second request is processed by the second service to apply the change to the state associated with the edge device; determining, based on one or more attributes of the first request, that the first request is associated with a first set of subscriptions related to the edge device; identifying a set of client devices communicatively coupled to the first service and associated with the first set of subscriptions; and transmitting a set of messages notifying the set of client devices of the change to the state of the edge device.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
receiving, at a first interface provided by a first service, a first request that specifies a change to a state associated with an edge device;
transmitting a second request corresponding to the first request over a second interface provided by a second service, wherein the second request is processed by the second service to apply the change to the state associated with the edge device, wherein the first service implements a wrapper layer over the second interface provided by the second service, wherein the wrapper layer receives requests for accessing resources associated with the second service over the first interface, and wherein the first service implements a translation layer that converts requests received at the first interface into a format compatible with the second interface and further converts responses received from the second service over the second interface into a format compatible with the first interface;
determining, based on one or more attributes of the first request, that the first request is associated with a first set of subscriptions related to the edge device;
identifying a set of client devices communicatively coupled to the first service and associated with the first set of subscriptions; and
transmitting a set of messages notifying the set of client devices of the change to the state of the edge device.

2. The computer-implemented method of claim 1, further comprising converting the first request into the second request based on a first format associated with the first interface and a second format associated with the second interface.

3. The computer-implemented method of claim 1, further comprising converting the first request into the second request based on a first set of headers associated with the first interface and a second set of headers associated with the second interface.

4. The computer-implemented method of claim 1, further comprising adding a request identifier from the first request to the second request prior to transmitting the second request over the second interface.

5. The computer-implemented method of claim 1, further comprising:
receiving a first response to the second request from the second service; and
transmitting a second response corresponding to the first response over the first interface.

6. The computer-implemented method of claim 1, further comprising:
receiving a third request from a first client device to subscribe to one or more resources associated with the change to the state; and
verifying that the first client device is authorized to access the one or more resources prior to updating the first set of subscriptions with a first subscription for the first client device to the one or more resources associated with the change to the state.

7. The computer-implemented method of claim 1, wherein determining that the first request is associated with the first set of subscriptions comprises matching one or more parameters included in the first request to metadata associated with the first set of subscriptions.

8. The computer-implemented method of claim 1, wherein determining that the first request is associated with the first set of subscriptions comprises matching a type of the first request to metadata associated with the first set of subscriptions.

9. The computer-implemented method of claim 1, wherein identifying the set of client devices comprises retrieving a set of identifiers for the set of client devices from the first set of subscriptions.

10. The computer-implemented method of claim 1, wherein each message included in the set of messages is transmitted over a web socket connection to a corresponding client device included in the set of client devices.

11. The computer-implemented method of claim 1, wherein the second request is transmitted to an endpoint associated with a type of the first request.

12. The computer-implemented method of claim 1, wherein the set of messages includes an update made by the second service in response to the second request.

13. The computer-implemented method of claim 1, wherein the change to the state associated with the edge device comprises at least one of registering the edge device, unregistering the edge device, starting a sensor coupled to the edge device, stopping a sensor coupled to the edge device, connecting a sensor coupled to the edge device, initiating anomaly detection on the sensor coupled to the edge device, ending anomaly detection on the sensor coupled to the edge device, a heartbeat request associated with the edge device, disconnecting a sensor coupled to the edge device, changing an upload rate associated with the edge device, updating a setting associated with the edge device, rebooting the edge device, updating the edge device, or shutting down the edge device.

14. The computer-implemented method of claim 1, wherein the second interface comprises a representational state transfer application programming interface.

15. One or more non-transitory computer-readable media storing instructions that, when executed by one or more processors, cause the one or more processors to perform operations including:
receiving, at a first interface provided by a first service, a first request that specifies a change to a state associated with an edge device;
transmitting a second request corresponding to the first request over a second interface provided by a second service, wherein the second request is processed by the second service to apply the change to the state associated with the edge device, wherein the first service implements a wrapper layer over the second interface provided by the second service, wherein the wrapper layer receives requests for accessing resources associated with the second service over the first interface, and wherein the first service implements a translation layer that converts requests received at the first interface into a format compatible with the second interface and further converts responses received from the second service over the second interface into a format compatible with the first interface;
determining, based on one or more attributes of the first request, that the first request is associated with a first set of subscriptions related to the edge device;
identifying a set of client devices communicatively coupled to the first service and associated with the first set of subscriptions; and
transmitting a set of messages notifying the set of client devices of the change to the state of the edge device.

16. The one or more non-transitory computer-readable media of claim 15, wherein the instructions further cause the one or more processors to perform the operation of converting the first request into the second request based on a first format associated with the first interface, a second format associated with the second interface, a first set of headers associated with the first request, and a second set of headers associated with the second request.

17. The one or more non-transitory computer-readable media of claim 15, wherein the instructions further cause the one or more processors to perform the operations of:
receiving a third request from a first client device to subscribe to one or more resources associated with the change to the state; and
verifying that the first client device is authorized to access the one or more resources prior to updating the first set of subscriptions with a first subscription for the first client device.

18. The one or more non-transitory computer-readable media of claim 15, wherein each subscription included in the first set of subscriptions comprises at least one of a subscription identifier, an identifier for the edge device, a web socket identifier, or a type of update associated with the subscription.

19. The one or more non-transitory computer-readable media of claim 15, wherein the change to the state associated with the edge device comprises at least one of registering the edge device, unregistering the edge device, starting a sensor coupled to the edge device, stopping a sensor coupled to the edge device, connecting a sensor coupled to the edge device, initiating anomaly detection on the sensor coupled to the edge device, ending anomaly detection on the sensor coupled to the edge device, a heartbeat request associated with the edge device, disconnecting a sensor coupled to the edge device, changing an upload rate associated with the edge device, updating a setting associated with the edge device, rebooting the edge device, updating the edge device, or shutting down the edge device.

20. A computing device, comprising:
a processor; and
a non-transitory computer-readable medium having stored thereon instructions that, when executed by the processor, cause the processor to perform operations including:
receiving, at a first interface provided by a first service, a first request that specifies a change to a state associated with an edge device;
transmitting a second request corresponding to the first request over a second interface provided by a second service, wherein the second request is processed by the second service to apply the change to the state associated with the edge device, wherein the first service implements a wrapper layer over the second interface provided by the second service, wherein the wrapper layer receives requests for accessing resources associated with the second service over the first interface, and wherein the first service implements a translation layer that converts requests received at the first interface into a format compatible with the second interface and further converts responses received from the second service over the second interface into a format compatible with the first interface;
determining, based on one or more attributes of the first request, that the first request is associated with a first set of subscriptions related to the edge device;
identifying a set of client devices communicatively coupled to the first service and associated with the first set of subscriptions; and
transmitting a set of messages notifying the set of client devices of the change to the state of the edge device.

* * * * *